(12) United States Patent
Dressler et al.

(10) Patent No.: US 12,485,568 B2
(45) Date of Patent: Dec. 2, 2025

(54) MACHINING TOOL

(71) Applicant: Ledermann GmbH & Co. KG, Horb am Neckar (DE)

(72) Inventors: Martin Dressler, Schorndorf (DE); Holger Grotzke, Horb-Rexingen (DE)

(73) Assignee: Ledermann GmbH & Co. KG, Horb am Neckar (DE)

( * ) Notice: Subject to any disclaimer, the term of this patent is extended or adjusted under 35 U.S.C. 154(b) by 314 days.

(21) Appl. No.: 18/174,420

(22) Filed: Feb. 24, 2023

(65) Prior Publication Data
US 2023/0264381 A1  Aug. 24, 2023

(30) Foreign Application Priority Data
Feb. 24, 2022  (EP) ..................................... 22158518

(51) Int. Cl.
*B27G 13/02* (2006.01)
*B23C 5/04* (2006.01)
*B23C 5/18* (2006.01)

(52) U.S. Cl.
CPC ............... *B27G 13/02* (2013.01); *B23C 5/04* (2013.01); *B23C 5/18* (2013.01); *B23C 2210/086* (2013.01)

(58) Field of Classification Search
CPC .......... B27G 13/02; B27G 13/08; B23C 5/04; B23C 5/18
See application file for complete search history.

(56) References Cited

U.S. PATENT DOCUMENTS

| 8,974,155 B2 * | 3/2015 | Dressler ............... B27G 13/002 407/59 |
| 10,384,368 B2 * | 8/2019 | Freund .................. B27G 13/08 |
| 2012/0282045 A1 | 11/2012 | Dressler |
| 2014/0234038 A1 | 8/2014 | Freund et al. |

FOREIGN PATENT DOCUMENTS

| CN | 103192434 A | 7/2013 |
| EP | 2 353 758 A1 | 8/2011 |
| EP | 3 354 387 A1 | 8/2018 |

* cited by examiner

*Primary Examiner* — Matthew Katcoff
(74) *Attorney, Agent, or Firm* — Walter Ottesen, P.A.

(57) ABSTRACT

A machining tool has a main body with a carrier surface. Cutting bodies each having a cutting edge are arranged on the carrier surface, the edges rotating in a direction of rotation which runs around an axis of rotation during the machining. The edges of a group including a plurality of cutting bodies overlap in a gapless manner with respect to the direction perpendicular to the direction of rotation and form an overall edge. All of the edges are arranged between end points of the overall edge. The group has a minimum number of teeth defined by the number of edges at least situated one behind the other in the direction of rotation in an intermediate region of the overall edge. The edges of the group overlap with respect to the direction perpendicular to the direction of rotation such that the minimum number of teeth is at least two.

18 Claims, 13 Drawing Sheets

MACHINING TOOL

CROSS-REFERENCE TO RELATED APPLICATIONS

This application claims priority of European patent application no. 22 158 518.5, filed Feb. 24, 2022, the entire content of which is incorporated herein by reference.

TECHNICAL FIELD

The disclosure relates to a machining tool for machining materials, in particular wood or wood-like materials.

In the prior art, the cutting edges of the plurality of cutting bodies of such a machining tool generally together form a cutting line, which at least also extends in a direction perpendicular to the direction of rotation of the machining tool, in particular in the direction of the axis of rotation and/or in a radial direction with respect to the axis of rotation over the entire extent of the main body, in particular in the direction of the axis of rotation and/or in the radial direction with respect to the axis of rotation. Here, reference points of the cutting edges of the different multiple cutting bodies are spaced apart from one another in the direction perpendicular to the direction of rotation. The reference points may be defined, for example, as a corner of a cutting edge or as a center of a cutting edge with respect to the direction of the axis of rotation. The respective cutting edges overlap in the direction of the axis of rotation and/or in the radial direction with respect to the axis of rotation. The reference points of the cutting edges of the plurality of cutting bodies are arranged with an angular spacing to one another with respect to the axis of rotation. In the prior art, the cutting edges of the plurality of cutting bodies typically consist of extremely hard cutting materials, such as polycrystalline diamond. This material can be processed only in limited dimensions. This is one of the possible reasons why the cutting line on the main body is composed of the cutting edges of the plurality of cutting bodies. The reference points of the cutting edges of the plurality of cutting bodies have an angular spacing to one another with respect to the axis of rotation. This angular spacing of the cutting edges to one another is necessary in order for the cutting edges to be able to be eroded or ground in isolation from one another. During the eroding or grinding process of a cutting edge, the cutting edges of cutting bodies which are adjacent in the direction of the axis of rotation are not adversely affected due to the angular spacing. An angular spacing of 5° to 10° between the reference points is generally sufficient for this.

In order for the cutting line formed from the cutting edges of the plurality of cutting bodies to have no gaps, the cutting edges overlap with respect to the direction perpendicular to the direction of rotation, in particular with respect to the direction of the axis of rotation and/or with respect to the radial direction with respect to the axis of rotation. In the direction of rotation of the machining tool, the overlapping cutting edges of a cutting line engage with the workpiece over a short distance in a direction of engagement. In general, a plurality of cutting lines are arranged one behind the other in the direction of rotation on the main body of the machining tool, as a result of which a multi-toothed tool is formed. The regions of overlap of the different overall cutting edges lie one behind the other in the direction of rotation. Reference is made to a doubling of the number of teeth in the region of overlap. The number of teeth is the number of the different cutting edges of the different cutting bodies that successively engage into the workpiece in the direction of rotation of the machining tool during a revolution of the machining tool. In the case of the machining tool according to the prior art, the regions of overlap of the cutting edges of the plurality of cutting bodies stand out as marks in the workpiece.

SUMMARY

It is an object of the disclosure to further develop a machining tool in such a way that the machining marks on a workpiece machined using the machining tool are minimized.

This object is, for example, achieved via a machining tool for machining materials. The machining tool is configured to be driven in rotation about an axis of rotation. The machining tool includes: a main body defining a cutter carrier surface, wherein the axis of rotation runs through the main body; a plurality of cutting bodies each having a cutting edge and being arranged on the cutter carrier surface; the cutting edges being configured to rotate in a direction of rotation which runs around the axis of rotation during the machining; wherein the cutting edges of a group including a multiplicity of the plurality of cutting bodies overlap in a gapless manner with respect to a direction perpendicular to the direction of rotation and thus form an overall cutting edge; one of the cutting edges of the group being an initial cutting edge of the overall cutting edge; one of the cutting edges of the group being a final cutting edge of the overall cutting edge; an intermediate region of the overall cutting edge lying completely between the initial cutting edge and the final cutting edge with respect to the direction perpendicular to the direction of rotation; all of the cutting edges of the machining tool being arranged between a first end point of the overall cutting edge and a second end point of the overall cutting edge; the first end point being assigned to the initial cutting edge and the second end point being assigned to the final cutting edge; the machining tool defining an imaginary helix line running from the initial cutting edge to the final cutting edge; the imaginary helix line defining a central axis which corresponds to the axis of rotation; the imaginary helix line running at least partially around the central axis; the imaginary helix line having a gradient which corresponds to a quotient of a progression of the imaginary helix line in the direction perpendicular to the direction of rotation and a progression of the imaginary helix line with regard to an angle of rotation about the axis of rotation; all of the cutting edges of the group being at least partially arranged on the imaginary helix line; the group having a minimum number of teeth, wherein the minimum number of teeth is defined by a number of the cutting edges of the group that are at least situated in succession in the direction of rotation of the machining tool in the intermediate region of the overall cutting edge; and, the cutting edges of the group overlap with respect to the direction perpendicular to the direction of rotation such that the minimum number of teeth is at least two.

According to the disclosure, the cutting edges of the plurality of cutting bodies of the group overlap in a gapless manner with respect to the direction perpendicular to the direction of rotation and thus form an overall cutting edge. The group of the plurality of cutting bodies is also referred to as plurality of cutting bodies. One cutting edge of the plurality of cutting bodies is an initial cutting edge of the overall cutting edge. One cutting edge of the plurality of cutting bodies is a final cutting edge. The initial cutting edge forms the start of the overall cutting edge with respect to the direction perpendicular to the direction of rotation. The final cutting edge forms the end of the overall cutting edge with respect to the direction perpendicular to the direction of rotation. The overall cutting edge has an intermediate region. The intermediate region lies completely between the initial cutting edge and the final cutting edge with respect to the direction perpendicular to the direction of rotation. The intermediate region in particular extends between the initial cutting edge and the final cutting edge in an interruption-free manner with respect to the direction perpendicular to the direction of rotation.

By way of example, in the case of a machining tool with a substantially cylindrical main body, the intermediate region lies between planes perpendicular to the axis of rotation, one of the planes being tangent to the initial cutting edge at its end facing the final cutting edge and the other of the planes being tangent to the final cutting edge at its end facing the initial cutting edge.

All of the cutting edges of the machining tool are arranged between end points of the overall cutting edge. The one end point is assigned to the initial cutting edge. The other end point is assigned to the final cutting edge. In particular, all of the cutting edges of the machining tool are arranged between end points of the overall cutting edge with respect to the direction perpendicular to the direction of rotation.

An imaginary helix line runs from the initial cutting edge to the final cutting edge. In particular, the imaginary helix line runs from the initial cutting edge to the final cutting edge in an interruption-free manner. The helix line has a central axis which corresponds to the axis of rotation. The helix line runs at least partially, expediently completely, in particular multiple times, around the central axis. The helix line has a gradient. The gradient corresponds to the quotient of a progression of the helix line in the direction perpendicular to the direction of rotation and a progression of the helix line with regard to an angle of rotation about the axis of rotation. Expediently, the gradient of the helix line is greater than zero, in particular for each point of the helix line. In particular, the gradient of the helix line is constant. In particular, the progression of the helix line in the direction perpendicular to the direction of rotation is proportional to the progression of the helix line with regard to the angle of rotation about the axis of rotation. In particular, the imaginary helix line has the form of a helix. In particular, the imaginary helix line has the form of a planar spiral. However, provision may also be made for the helix line to be composed of a planar spiral and of a helix. This may for example be the case in the case of a cylindrical main body, in the case of which the helix line runs in the form of a planar spiral on the end surface and/or in the form of a helix on the circumferential surface. Provision may also be made for the imaginary helix line to have the form of a helix with variable spacing to the axis of rotation. This is for example the case in the case of a cutter carrier surface with a contour. In particular, the helix line with respect to the cutter carrier surface has a spacing measured perpendicular to the cutter carrier surface. In particular, the spacing is constant. All of the cutting edges of the plurality of cutting bodies are preferably at least partially arranged on the helix line. In particular, each cutting edge of the plurality of cutting bodies has a point of intersection with the helix line. Provision may also be made for the entire cutting edge of one of the cutting edges of the plurality of cutting bodies to be arranged over the helix line with respect to a direction perpendicular to the cutter carrier surface.

The plurality of cutting bodies have a minimum number of teeth. The minimum number of teeth is defined by the number of cutting edges of the cutting bodies of the plurality of cutting bodies that are at least situated one behind the other in the direction of rotation of the machining tool in the intermediate region of the overall cutting edge. The region lying behind the entire initial cutting edge and behind the entire final cutting edge in the direction of rotation is not taken into consideration when determining the minimum number of teeth of the plurality of cutting bodies. Only cutting edges of the plurality of cutting bodies are taken into consideration when determining the minimum number of teeth. Cutting edges of cutting bodies that do not belong to the plurality of cutting bodies are not taken into consideration.

According to the disclosure, the cutting edges of the plurality of cutting bodies overlap in such a way that the minimum number of teeth of the plurality of cutting bodies overlap with respect to the direction perpendicular to the direction of rotation, in particular with respect to the direction of the axis of rotation, in such a way that the minimum number of teeth is at least two, in particular at least three, in particular at least four.

This makes it possible to achieve a large number of teeth for the entire machining tool without having to arrange a plurality of cutting lines one behind the other in the direction of rotation. With only a single group of a plurality of cutting bodies, any desired number of teeth can be achieved. It is not necessary for a plurality of overall cutting edges, which are each composed of a plurality of cutting edges, to have to be arranged one behind the other with respect to the direction of rotation. In particular, it is thereby possible to avoid a situation in which a plurality of end points of cutting edges lie one behind the other in the direction of rotation. It is thereby possible for no resultant mark to stand out in the workpiece. The machining marks on a workpiece machined using the machining tool are minimized.

Advantageously, the machining tool includes only a single group of cutting bodies, the cutting edges of which overlap, between the end points of the overall cutting edge, in a gapless manner with respect to the direction perpendicular to the direction of rotation and the cutting edges of which are at least partially arranged on a helix line.

In an embodiment of the disclosure, provision is made for the axis of rotation to run in an axial direction through the main body, and for the cutting edges of the plurality of cutting bodies to overlap in a gapless manner with respect to the axial direction and to thus form the overall cutting edge. In particular, the direction perpendicular to the direction of rotation extends exclusively in the direction of the axis of rotation. In particular, the intermediate region of the overall cutting edge lies completely between the initial cutting edge and the final cutting edge with respect to the axial direction. In particular, all of the cutting edges of the machining tool are arranged with respect to the axial direction in the region of the overall cutting edge. In particular, an imaginary helical surface runs around the axis of rotation. With respect to a coordinate system, the origin of which lies on the axis of rotation (z axis) and which has a polar axis (x axis) which runs perpendicular to the axis of rotation and in relation to which the angle α is measured in the xy plane running perpendicular to the axis of rotation, the helical surface is parametrized as follows:

$$x = r\cos(\alpha)$$

$$y = r\sin(\alpha)$$

$$z = f(\alpha),$$

where r and α assume all real values, that is, range from −∞ to +∞, and f(α) is a function with f'(α)>0. In particular, f(α) is a continuous function. In particular, f(α)=cα applies, the constant being c>0.

Expediently, all of the cutting edges of the plurality of cutting bodies are at least partially arranged on the helical surface. In particular, each cutting edge of the plurality of cutting bodies intersects the helical surface. Provision may also be made for one, a plurality or all of the cutting edges of the plurality of cutting bodies to lie completely in the helical surface. The at least partial arrangement of the cutting edges of the plurality of cutting bodies on the helical surface may be provided instead of or in addition to the partial arrangement on the helix line. In particular, the cutting edges of the plurality of cutting bodies overlap with respect to the axial direction in such a way that the minimum number of teeth is at least two, in particular at least three, in particular at least four.

Advantageously, the cutting edges of the plurality of cutting bodies, which form the overall cutting edge, in each case only partially mutually overlap with respect to the direction perpendicular to the direction of rotation. As a result, a high number of teeth can be achieved and at the same time the cutting edges of the plurality of cutting bodies can be arranged such that their end points reliably do not overlap with respect to the direction perpendicular to the direction of rotation. In the direction of rotation, no further end point of a cutting edge of the plurality of cutting bodies then lies behind an end point of a cutting edge of the plurality of cutting bodies. This produces a cross section on the tool in which no contiguous, continuous marks whatsoever can be identified.

In particular, each cutting edge of the plurality of cutting bodies has exactly one reference point. In particular, the reference point lies in the center of the cutting edge in the direction perpendicular to the direction of rotation. Expediently, the reference points of the cutting edges of the plurality of cutting bodies are spaced apart from one another in the direction perpendicular to the direction of rotation. In particular, reference points, which are directly adjacent in the direction perpendicular to the direction of rotation, of the cutting edges of the plurality of cutting bodies are each arranged with angular spacings to one another with respect to the axis of rotation.

In particular, provision is made according to the disclosure for the angular spacings of those reference points of the cutting edges of the plurality of cutting bodies which are directly adjacent in the direction perpendicular to the direction of rotation with respect to the axis of rotation to in each case be an integer multiple of angle values from an angle range.

The set of integer multiples also includes the singular multiple. Angular spacings may also correspond to one times an angle value from the angle range.

Preferably, the reference points of the cutting edges of the plurality of cutting bodies all have a common, identical property with regard to their position. The reference point of a cutting edge in particular lies in the center of the cutting edge with respect to the direction perpendicular to the direction of rotation. Preferably, the reference point lies in the center of the cutting edge with respect to the direction of the axis of rotation and/or with respect to the radial direction with respect to the axis of rotation. The direction of rotation is also referred to as circumferential direction. The direction of rotation runs around the axis of rotation. When rotating in the direction of rotation, the machining tool rotates in the direction intended for chip removal.

The plurality of cutting bodies may concern all of the cutting bodies arranged on the main body. However, it may also concern a group of cutting bodies which represents merely a subset of all of the cutting bodies. When using the term "group" for the plurality of cutting bodies, this may also concern all of the cutting bodies of the machining tool. The plurality of cutting bodies include at least three, in particular at least four, in particular at least five, cutting bodies. The plurality of cutting bodies are also referred to as a group.

The angle values preferably lie in an angle range. In particular, the angle values lie in an angle range of 10° to 350°, in particular of 30° to 330°, in particular of 60° to 270°, preferably of 90° to 180°. Due to the resultant angular spacing between reference points of the plurality of cutting bodies that are directly adjacent in the direction perpendicular to the direction of rotation, the two associated cutting edges engage with a spacing into the surface of the machined workpiece which is simultaneously advanced at a feed rate. If these two cutting edges with reference points that are directly adjacent in the direction perpendicular to the direction of rotation overlap in the direction perpendicular to the direction of rotation, these regions of overlap do not stand out as a contiguous mark in the surface of a workpiece machined using the machining tool according to the disclosure. The marks which the cutting edges of the plurality of cutting bodies with directly adjacent reference points leave behind on the workpiece are spaced apart from one another on the workpiece in a feed direction owing to the angular offset brought about by the angular spacing of the reference points.

The spacing between the engagement locations of the cutting edges of the plurality of cutting bodies with reference points that are directly adjacent in the direction perpendicular to the direction of rotation on the workpiece is substantially greater than in the prior art. As a result, the engagement locations of the cutting edges with directly adjacent reference points on the workpiece are not perceived as a contiguous mark.

Expediently, the angular spacings are all of equal size.

In particular, the angle range extends from a first limit value up to a second limit value. The first limit value in particular corresponds to the difference between the magnitude of the golden angle and 5°. The second limit value in particular corresponds to the sum of the magnitude of the golden angle and 5°. The golden angle lies within the angle range and is included therein. Accordingly, the angle values in particular lie in an angle range of +/−5° with respect to the golden angle. The boundary values are part of the angle range. The golden angle is defined such that the sum of the golden angle and an opposite angle produces the round angle, and that the ratio of golden angle to opposite angle is equal to the ratio of opposite angle to round angle. The round angle corresponds to 360°. In other words, the sum of the magnitude of the golden angle and the magnitude of the opposite angle gives 360°, and the ratio of golden angle to opposite angle is equal to the ratio of opposite angle to 360°. The magnitude of the opposite angle corresponds to the difference between 360° and the magnitude of the golden angle. The golden angle is smaller than 360°. The golden angle is produced when the round angle is divided according to the golden ratio. The smaller of the resultant two angles is referred to as golden angle. When dividing the round angle according to the golden ratio, 360° is divided by the golden number φ. The golden number φ can be calculated by the following formula:

$\phi=(1+\sqrt{5})/2\approx1.6180339887.$

The golden number $\phi$ corresponds to the ratio of two successive sequence elements $f_{n+1}$ and $f_n$ of the Fibonacci sequence for n≥∞. The Fibonacci sequence $f_1, f_2, f_3 \ldots$ is defined by the recursive formation law $f_n = f_{n-1} + f_{n-2}$ for $n \geq 3$ with the initial values $f_1 = f_2 = 1$ For the golden number $\phi$, the following applies:

$$\Phi = \lim_{n\to\infty} \frac{f_{n+1}}{f_n}.$$

The golden angle is:

$360° - 360°/\phi \approx 137.507764° \approx 137.5°.$

Accordingly, the angle values preferably lie in an angle range of about 132.5° to about 142.5°.

As an alternative, provision may also be made for the angle values to lie in an angle range of 132.5° to 142.5°.

The direction of rotation runs in the form of a circle around the axis of rotation. The direction perpendicular to the direction of rotation is a direction which lies in planes which contain the axis of rotation. The spacing direction of reference points that are spaced apart from one another in the direction perpendicular to the direction of rotation results from the fact that the associated cutting edges are arranged on the main body of the machining tool or on the surface of the main body. The surface of the main body on which the cutting bodies are arranged is also referred to as cutter carrier surface. The direction perpendicular to the direction of rotation may also run along a surface contour of the main body, the surface contour having a curved profile in the associated plane containing the axis of rotation. In this case, the direction perpendicular to the direction of rotation follows this curved profile and then correspondingly points in different directions at different locations on the surface of the main body. The direction perpendicular to the direction of rotation follows the cutting line between the cutter carrier surface and a plane in which the axis of rotation lies. In particular, the direction perpendicular to the direction of rotation is the direction of the axis of rotation. In particular, the direction perpendicular to the direction of rotation is the radial direction with respect to the axis of rotation. In particular, the direction perpendicular to the direction of rotation is composed of a proportion of the direction of the axis of rotation and a proportion of the radial direction with respect to the axis of rotation. In particular, the direction perpendicular to the direction of rotation runs along the cutter carrier surface. In particular, the direction perpendicular to the direction of rotation varies along the cutter carrier surface.

In particular, the reference points that are spaced apart from one another in the direction perpendicular to the direction of rotation are spaced apart from one another in the direction of the axis of rotation and/or in the radial direction with respect to the axis of rotation. In this case, reference points that are directly adjacent in the direction perpendicular to the direction of rotation are spaced apart directly in the direction of the axis of rotation and/or in the radial direction with respect to the axis of rotation.

The angular spacings, determined from the indicated angle values, of the reference points to one another produces an ideal distribution of the plurality of cutting bodies on the main body with respect to the circumferential direction around the axis of rotation of the machining tool. In other words, an ideal distribution of the plurality of cutting bodies in the direction of rotation of the machining tool is produced.

The combination of a spacing of the reference points of the cutting edges of the plurality of cutting bodies in the direction perpendicular to the direction of rotation, in particular in the direction of the axis of rotation and/or in the radial direction with respect to the axis of rotation, and the arrangement of the reference points with angular spacings, which correspond in each case to an integer multiple of angle values from the angle range around the golden angle, produces an ideal distribution of the reference points of the cutting edges of the plurality of cutting bodies and thus also of the plurality of cutting bodies themselves on the outer surface of the main body. Owing to this regular distribution, it is possible to arrange many more cutting bodies with cutting edges on the circumferential surface than in the prior art. This makes it possible to increase the cutting performance and minimize the machining time.

The combination of a spacing of the reference points of the cutting edges of the plurality of cutting bodies in the direction perpendicular to the direction of rotation, in particular in the direction of the axis of rotation and/or in the radial direction with respect to the axis of rotation, and the arrangement of the reference points with angular spacings, which correspond in each case to an integer multiple of angle values from the angle range around the golden angle, results in a further positive effect. When machining a workpiece with a machining tool according to the prior art, the reference points of the cutting edges of the plurality of cutting bodies are arranged, for example, with angular spacings of 5° to one another. In addition, a plurality of cutting lines are provided one behind the other in the direction of rotation. By way of example, it is possible for four cutting lines to each be arranged with an angular spacing of 90° to one another. When machining a workpiece with a conventional machining tool, the angular offset of the cutting lines relative to one another results in engagement shocks that are spaced apart regularly in terms of time and space. These regular engagement shocks induce vibrations both in the machining tool and in the machined workpiece.

Expediently offsetting the reference points of the cutting edges of the plurality of cutting bodies by a multiple of the angle value makes it possible to avoid a situation where two reference points come to lie at the same angular position. The golden number $\phi$ is an irrational number. It cannot be represented as a fraction of two integers. The golden number $\phi$ is also called the "most irrational" of all numbers because it is particularly poorly approximable by rational numbers.

The reference points of the cutting edges of the plurality of cutting bodies are distributed over the surface of the main body of the machining tool in a particularly uniform manner due to the advantageous combination of the angular spacings from the range around the golden angle with the spacing of the reference points to one another in the direction perpendicular to the direction of rotation. This has the result, in particular, that when machining a workpiece with the machining tool according to the disclosure, there are no large pauses or spacings on the workpiece between two successive engagements of cutting edges of the plurality of cutting bodies with reference points that are directly adjacent in the direction of rotation into the workpiece. In the case of a machining tool according to the prior art, large angle ranges without a cutting edge or without a reference point occur between the cutting lines, formed by the plurality of cutting edges, on the circumferential surface of the machining tool. These large angle ranges without a cutting edge or without a reference point are disadvantageous with regard to the generation of vibrations. With the uniform circumferential distribution of the reference points and of the cutting edges according to the disclosure, relatively large angle portions without a cutting edge and without a reference point are avoided. As a result, the generation of oscillations is largely suppressed. This has the effect that, when machining a workpiece with the machining tool according to the disclosure, machining marks caused by vibrations emerge on the workpiece only to a very small extent.

In the case of machining tools according to the prior art, cutting edges with directly adjacent reference points of a cutting line are arranged with regular, short spacings in the direction of rotation of the machining tool. When machining a workpiece with the conventional machining tool, this gives rise to the generation of a sound with a relatively high frequency, which is perceived as dominant. In the case of the machining tool according to the disclosure, the angular spacings of reference points that are directly adjacent in the direction perpendicular to the direction of rotation are significantly greater than in the prior art. Due to the fact that the angular spacings in particular lie in the region of the golden angle, the frequency generated by the machining tool when machining a workpiece is reduced. Sounds of lower frequency are perceived more softly by the human ear than sounds of higher frequency. Therefore, the machining tool is perceived more softly than a machining tool according to the prior art.

It has been shown that, for the same degree of chip removal, the machining tool according to the disclosure consumes less energy than a comparable machining tool according to the prior art.

The angle values, the integer multiples of which correspond to the angular spacings, advantageously lie in an angle range of +/−1° with respect to the golden angle. This means that the first limit value, from which the angle range extends, corresponds to the difference between the magnitude of the golden angle and 1°, and that the second limit value, up to which the angle range extends, corresponds to the sum of the magnitude of the golden angle and 1°. The golden angle itself is included by this angle range. The limit values are included in the angle range.

The angle values preferably lie in an angle range of +/−0.5° with respect to the golden angle. The angle range extends from the first limit value, namely the difference between the magnitude of the golden angle and 0.5°, up to the second limit value, namely the sum of the magnitude of the golden angle and 0.5°. This angle range also includes the golden angle. The limit values are included in the angle range.

Advantageously, the angle values for all angular spacings between reference points, which are directly adjacent in the direction perpendicular to the direction of rotation, of the cutting edges of the plurality of cutting bodies are of equal size. Only a single angle value from the angle range is used to determine the angular spacings.

In particular, the angular spacings between reference points, which are directly adjacent in the direction perpendicular to the direction of rotation, of the cutting edges of the plurality of cutting bodies correspond to one times the angle values from the angle range.

In particular, the plurality of cutting bodies are fastened to the main body in an exchangeable manner. As an alternative, the plurality of cutting bodies may be fastened to the main body in a non-releasable manner. By way of example, the plurality of cutting bodies may be fastened to the main body by way of a solder connection. However, provision may also be made for the cutting bodies to be formed integrally with the main body. In particular, the cutting bodies are formed materially integrally with the main body. Advantageously, the cutting edges are formed integrally with the cutting bodies.

The main body of the machining tool has a circumferential surface with respect to the axis of rotation. The circumferential surface runs around the axis of rotation. The circumferential surface extends in the intended direction of rotation of the machining tool. The circumferential surface encloses the axis of rotation. The main body is delimited by an end surface in the direction of the axis of rotation. The plurality of cutting bodies are expediently arranged on the circumferential surface of the machining tool. Provision may be made for the plurality of cutting bodies to be arranged exclusively on the circumferential surface of the main body of the machining tool. In particular, the plurality of cutting bodies are arranged on the end surface of the main body of the machining tool. Provision may be made for the plurality of cutting bodies to be arranged exclusively on the end surface of the main body of the machining tool. However, provision may also be made for the plurality of cutting bodies to be arranged both on the circumferential surface of the main body of the machining tool and on the end surface of the main body of the machining tool.

In particular, those reference points of the plurality of cutting bodies which are directly adjacent in the direction perpendicular to the direction of rotation are arranged with an axial spacing, measured in the direction of the axis of rotation, to one another. In particular, the reference points of cutting edges that are adjacent in the direction of the axis of rotation are arranged with an axial spacing to one another when the cutting bodies associated with the reference points are arranged on the circumferential surface of the main body.

In particular, the reference points which are directly adjacent in the direction perpendicular to the direction of rotation are arranged with a radial range spacing to one another. The radial range spacing corresponds to the difference between the larger radial spacing and the smaller radial spacing of the radially directly adjacent reference points. A radial spacing is the spacing between a reference point and the axis of rotation. The plurality of cutting bodies may be arranged such that a circular-ring-shaped region, the center of which lies on the axis of rotation, can be arranged between their reference points. The circular-ring-shaped region has a radial width measured radial to the axis of rotation. Reference points of the cutting edges of the plurality of cutting bodies that are radially directly adjacent to one another are reference points between which the circular-ring-shaped region with the smallest radial width with regard to a considered reference point lies.

When ascertaining the circular-ring-shaped region with the smallest radial width, radial widths with a value of zero are excluded. A plurality of groups of a plurality of cutting bodies may be arranged on the main body, which each individually have the properties described in connection with the plurality of cutting bodies.

In particular, radially adjacent reference points are arranged with the radial range spacing to one another when the assigned cutting edges of the plurality of cutting bodies are arranged on the end surface of the main body of the machining tool. Preferably, the axial spacings between all directly adjacent reference points of the plurality of cutting bodies and/or the radial range spacings between all directly adjacent reference points are of equal size.

Provision may also be made both for reference points of cutting edges which are adjacent in the direction of the axis of rotation to be arranged with the axial spacing to one another and for radially adjacent reference points to be arranged with the radial range spacing to one another. In a particular configuration of the disclosure, reference points may be directly adjacent both in the direction of the axis of rotation and in the radial direction with respect to the axis of rotation. This may for example be the case when the circumferential surface of the main body at least partially substantially corresponds to the surface of a cone. Another example of this is a contour cutter, the circumferential surface of which may have an irregular contour.

In particular, the cutting edges of the plurality of cutting bodies have axial widths measured in the direction of the axis of rotation. Provision may also be made for the cutting edges of the plurality of cutting bodies to have no technically relevant axial widths measured in the direction of the axis of rotation.

In particular, the cutting edges of the plurality of cutting bodies have radial widths measured in the radial direction with respect to the axis of rotation. Provision may also be made for the cutting edges of the plurality of cutting bodies to have no technically relevant radial widths measured in the radial direction with respect to the axis of rotation.

Provision may also be made for the cutting edges of the plurality of cutting bodies to have both axial widths measured in the direction of the axis of rotation and radial widths measured in the radial direction with respect to the axis of rotation. In particular, one portion of the plurality of cutting bodies has cutting edges exclusively with a radial width and another portion of the plurality of cutting bodies has cutting edges exclusively with an axial width. This may in particular be the case when one portion of the plurality of cutting bodies is arranged on the end surface of the main body and another portion of the plurality of cutting bodies is arranged on the circumferential surface of the main body.

In an embodiment of the disclosure, provision may be made for the same cutting edge to have both an axial width and a radial width. This may in particular be the case when the circumferential surface of the main body of the machining tool at least partially corresponds to the form of the lateral surface of a cone. Another example of this is a contour cutter, the circumferential surface of which may have an irregular contour.

In an embodiment of the disclosure, provision is made for the axial spacing to be from 1% to 50%, in particular from 8% to 50%, in particular from 8% to 35%, in particular from 10% to 35%, in particular from 10% to 30%, of the greatest axial width of the cutting edges of the plurality of cutting bodies, in particular of the mean value of all axial widths of the cutting edges of the plurality of cutting bodies. Expediently, the radial range spacing is from 1% to 50%, in particular from 8% to 50%, in particular from 8% 35%, in particular from 10% to 35%, in particular from 10% to 30%, of the greatest radial width of the cutting edges of the plurality of cutting bodies, in particular of the mean value of all radial widths of the cutting edges of the plurality of cutting bodies. Provision may also be made for the plurality of cutting bodies to include cutting bodies with reference points with an axial spacing to one another and cutting bodies with reference points with a radial range spacing to one another, at least one axial spacing being in one of the ratios indicated above with respect to the greatest axial width, in particular with respect to the mean value of all axial widths of the plurality of cutting bodies, and at least one radial range spacing being in one of the ratios indicated above with respect to the greatest radial width, in particular with respect to the mean value of all radial widths of the plurality of cutting bodies. A corresponding selection of the axial spacing and/or of the radial range spacing makes it possible to determine the degree of overlap of cutting edges which are directly adjacent in the direction perpendicular to the direction of rotation. This selection may also influence the number of teeth—that is, the number of cutting edges which are situated one behind the other with respect to the direction of rotation.

The axial widths of the cutting edges of all of the plurality of cutting bodies are preferably of equal size. The axial widths of the cutting edges of all of the plurality of cutting bodies which are arranged on the circumferential surface of the main body of the machining tool are preferably of equal size. The radial widths of the cutting edges of all of the plurality of cutting bodies are preferably of equal size. The radial widths of the cutting edges of all of the cutting bodies which are arranged on the end surface of the main body of the machining tool are preferably of equal size.

In an embodiment of the disclosure, the axial widths of the cutting edges of the plurality of cutting bodies are of different size. In particular, the radial widths of the cutting edges of the plurality of cutting bodies are of different size. Provision may be made for the axial widths of one portion of the cutting edges of the plurality of cutting bodies to be of different size, and for the radial widths of the other portion of the cutting edges of the plurality of cutting bodies to be of different size. In combination with a constant axial spacing and/or a constant radial range spacing, the different size of the axial widths and/or the different size of the radial widths makes it possible to locally set a desired number of teeth in a targeted manner. This combination makes it possible to set the width of a region of overlap of cutting edges with reference points that are directly adjacent in the direction of rotation of the axis of rotation. In the case of machining tools with constant axial spacings and constant axial widths, the number of teeth corresponds to the quotient of axial width and axial spacing. By varying the axial widths, it is possible for the number of teeth to be changed locally with a constant axial spacing. Correspondingly, in the case of machining tools with constant radial widths and constant radial spacings, the number of teeth can be calculated from the quotient of radial width and radial spacing. By varying the radial widths, it is also possible here for the number of teeth to be changed locally with a constant radial spacing. In this way, the effective number of cutters can be increased at selected locations of the main body of the machining tool. This is advantageous for example for the machining of cover layers, for which an increased number of teeth is desired. In an analogous manner, the effective number of cutters can also be reduced at selected locations of the main body of the machining tool.

In an embodiment of the disclosure, the cutter carrier surface has a peripheral region which extends, with respect to the direction perpendicular to the axis of rotation, exactly over the entire initial cutting edge and/or exactly over the entire final cutting edge and which runs completely around the axis of rotation in the direction of rotation. This peripheral region is also referred to as lying behind the initial cutting edge and/or behind the final cutting edge in the direction of rotation. In particular, in addition to the plurality of cutting bodies, at least one further cutting body that does not belong to the plurality of cutting bodies is arranged in the peripheral region. It may be provided that the main body of the machining tool has the peripheral region in the direction of the axis of rotation and/or in the radial direction with respect to the axis of rotation, and that, in addition to the plurality of cutting bodies, the at least one further cutting body is arranged on the main body in the peripheral region and/or that the axial width and/or the radial width of at least one of the cutting edges of the plurality of cutting bodies in the peripheral region is greater or smaller than that of a cutting edge of a cutting body of the plurality of cutting bodies outside the peripheral region. In particular, the axial width and/or the radial width of at least the initial cutting edge and/or of at least the final cutting edge is greater or smaller than that of a cutting edge of a cutting body of the plurality of cutting bodies outside the peripheral region.

This makes it possible to achieve as uniform a number of teeth as possible over the entire extent of the main body in the direction perpendicular to the direction of rotation.

Advantageously, the axial spacings of all reference points, which are directly adjacent in the direction of the axis of rotation, of the cutting edges of the plurality of cutting bodies are of equal size. Advantageously, the radial range spacings of all reference points, which are directly adjacent in the direction of the axis of rotation, of the cutting edges of the plurality of cutting bodies are of equal size. Provision may also be made both for the axial spacings of all reference points, which are directly adjacent in the direction of the axis of rotation, of the cutting edges of the plurality of cutting bodies to be of equal size and for the radial range spacings of all reference points, which are directly adjacent in the direction of the axis of rotation, of the cutting edges of the plurality of cutting bodies to be of equal size.

In particular, the spacings, measured in the direction perpendicular to the direction of rotation, between reference points, which are directly adjacent in the direction perpendicular to the direction of rotation, of the plurality of cutting bodies are of different size. Expediently, the axial spacings between reference points, which are directly adjacent in the direction of the axis of rotation, of the plurality of cutting bodies are of different size. In particular, the radial range spacings between reference points, which are directly adjacent in the radial direction with respect to the axis of rotation, of the plurality of cutting bodies are of different size. In particular, provision may also be made both for the axial spacings between reference points, which are directly adjacent in the direction of the axis of rotation, of the plurality of cutting bodies to be of different size and for the radial range spacings of reference points, which are directly adjacent in the radial direction with respect to the axis of rotation, of the plurality of cutting bodies to be of different size. In combination with constant axial widths and/or constant radial widths, it is also possible to locally vary the number of teeth in this way.

In an embodiment of the disclosure, the reference point of a reference cutting edge selected in an arbitrary manner from the plurality of cutting bodies has angular spacings relative to the reference points of the cutting edges of all other ones of the plurality of cutting bodies, in particular relative to the reference points of the cutting edges of all cutting bodies of the machining tool, the angular spacings each corresponding to an integer multiple of a single angle value from the angle range. In other words, all of the angular spacings between all reference points of the plurality of cutting bodies, or between all reference points of all cutting bodies of the machining device, correspond to an integer multiple of a single angle value from the angle range. In particular, the machining tool has no cutting body with a cutting edge and a reference point that is arranged relative to another cutting body of the machining tool at an angular spacing that does not correspond to a multiple of the single angle value. As a result, the reference points of all cutting edges are distributed according to the Fibonacci golden ratio with respect to the direction of rotation of the machining tool. This produces an ideal distribution over the surface of the main body. A particularly uniform cross section is produced. The machining by the machining tool is effected in a particularly low-vibration, particularly quiet and particularly rapid manner.

In particular, the circumferential surface of the main body has substantially the form of a lateral surface of a cylinder. This means that an envelope can be placed around the main body without cutting bodies arranged thereon, the envelope having the form of a lateral surface of a cylinder. This envelope may cover any cutouts for receiving the cutting bodies. As a result of the cutouts, the actual form of the circumferential surface deviates from the form of a lateral surface of a cylinder. Nevertheless, the circumferential surface corresponds substantially to the form of the lateral surface of a cylinder.

In an embodiment of the disclosure, provision is made for the cutting edges of the plurality of cutting bodies to each be tilted, in a view in the radial direction with respect to the axis of rotation and of the reference point of a cutting edge, in relation to the axis of rotation by an axis angle. In the case of non-rectilinear cutting edges, the tilting is measured on the basis of a tangent to the respective cutting edge through the reference point. In particular, the tangent runs in the direction perpendicular to the radial direction with respect to the axis of rotation. The axis angle lies between −90° and +90°. The axis angle is the smaller of the two angles between the cutting edge and a plane perpendicular to the direction of rotation through the reference point. The positive axis angle is measured counterclockwise in relation to the outer side of the cutter carrier surface. The negative axis angle is measured clockwise in relation to the outer side of the cutter carrier surface. Provision may be made for one portion of the cutting edges of the plurality of cutting bodies to have an axis angle of greater than 0°, and for another portion to have an axis angle of smaller than 0°.

Provision may be made for at least a first group of a plurality of cutting bodies and a second group of a plurality of cutting bodies to be arranged on the main body of the machining tool. The plurality of cutting bodies assigned to a group may each individually have all or only some of the above-described properties of the plurality of cutting bodies. However, the plurality of cutting bodies assigned to a group have at least the properties of the plurality of cutting bodies according to the disclosure. In particular, an imaginary first helix line assigned to the first group runs around the axis of rotation in the opposite direction of rotation to a second helix line assigned to the second group.

The cutting edges of the plurality of cutting bodies expediently overlap in the direction perpendicular to the direction of rotation. In particular, those cutting edges of the plurality of cutting bodies which have reference points that are directly adjacent in the direction perpendicular to the direction of rotation overlap. In particular, all of the cutting edges of the plurality of cutting bodies that have reference points that are directly adjacent in the direction perpendicular to the direction of rotation overlap. As a result, gapless chip removal with respect to the direction perpendicular to the direction of rotation is effected by the cutting edges of the plurality of cutting bodies. This makes it possible for the marks left behind in the workpiece by the peripheral region (with respect to the direction perpendicular to the direction of rotation) of a cutting edge to be erased by a cutting edge which overlaps this peripheral region and which follows with respect to the direction of rotation.

The features described as optional above may be combined with one another in any desired manner, resulting in further advantageous configurations/embodiments.

BRIEF DESCRIPTION OF DRAWINGS

The invention will now be described with reference to the drawings wherein.

DETAILED DESCRIPTION

Figure 1A:
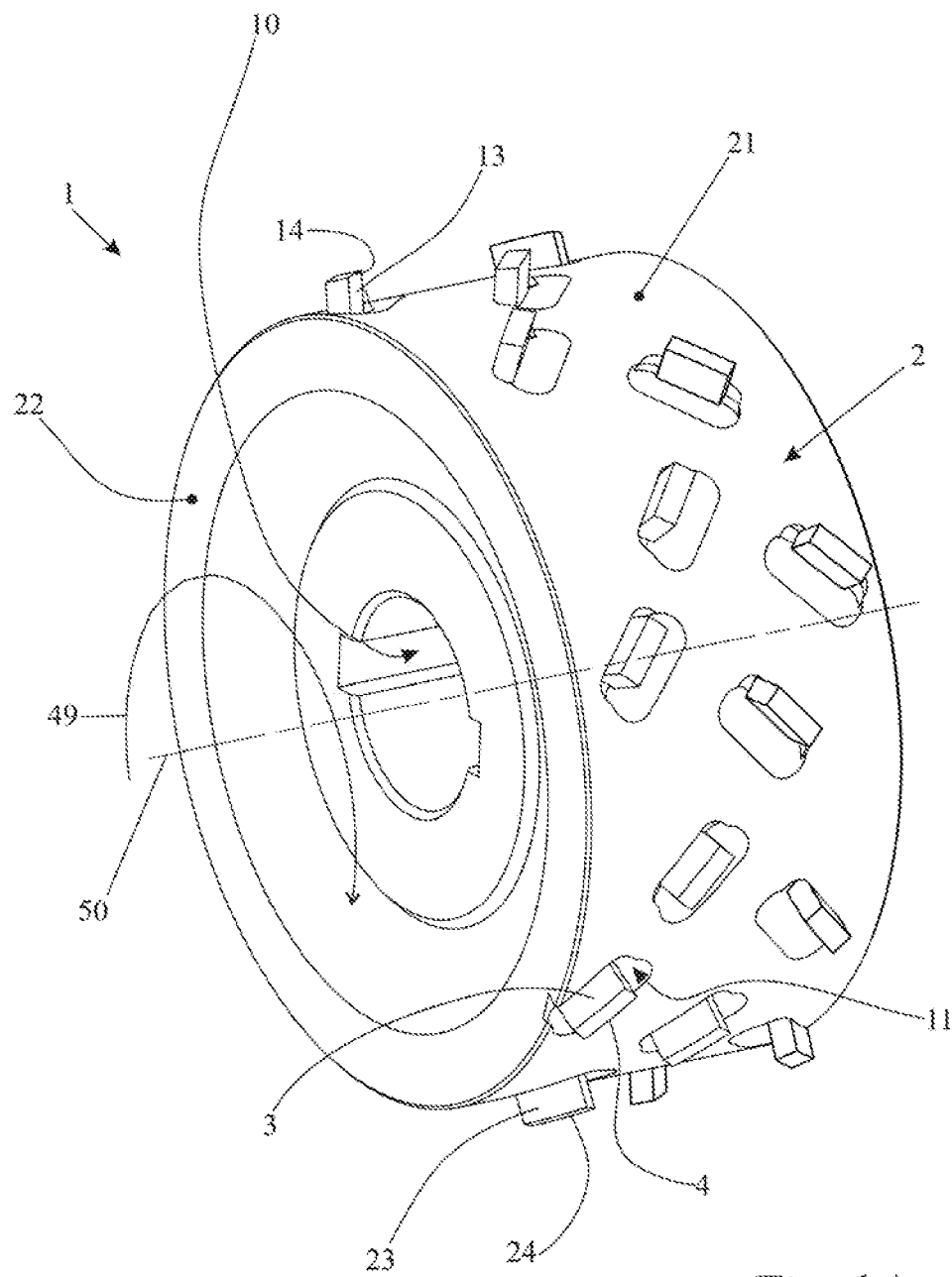
FIG. 1A shows a perspective illustration of a machining tool which can be rotated about an axis of rotation and which has a circumferential side enclosing the axis of rotation.

FIG. 1A shows a machining tool 1. The machining tool 1 is intended for machining materials. In the embodiments, the machining tool 1 is a milling tool, in particular a boring tool. However, it may also be an end mill, a cutter block, a profile miller, or the like. The machining tool 1 has an axis of rotation 50. The machining tool 1 is intended to be driven in rotation about the axis of rotation 50. The machining tool 1 has a main body 2. The axis of rotation 50 runs through the main body 2. The main body 2 has a cutout 10 for receiving a drive shaft (not illustrated). The machining tool 1 is configured for mounting on the drive shaft. In the embodiment according to FIG. 1A, the cutout 10 is an opening which passes completely through the main body 2. The axis of rotation 50 runs through the opening formed by the cutout 10. However, provision may also be made for the cutout 10 to not pass completely through the main body 2.

Arranged on the main body 2 are a plurality of cutting bodies, which are labeled by way of example with the reference designations 3, 13 and 23 in FIG. 1A. These cutting bodies are referred to below as a plurality of cutting bodies. In particular, the plurality of cutting bodies include more than two, preferably more than three, cutting bodies. In the embodiments, the plurality of cutting bodies include from 20 to 30 cutting bodies. Nevertheless, for the sake of clarity, the plurality of cutting bodies are denoted by three reference designations. The main body 2 has a cutter carrier surface. The plurality of cutting bodies 3, 13 and 23 are arranged on the cutter carrier surface. Provision may be made for the plurality of cutting bodies 3, 13, 23 to form merely a subset of all of the cutting bodies of the machining tool. In the embodiments, all of the cutting bodies of the machining tool 1 belong to the plurality of cutting bodies 3, 13, 23. The plurality of cutting bodies 3, 13, 23 are also referred to as a group.

The main body 2 has a circumferential surface 21. In the embodiment according to FIGS. 1A, 1B, 2A, 2B, 2C, 2D, 2E, 4 and 5, the circumferential surface 21 is the cutter carrier surface. The circumferential surface 21 completely encloses the axis of rotation 50. The main body 2 has an end surface 22. The end surface 22 delimits the circumferential surface 21 in the direction of the axis of rotation 50. In the embodiment according to FIG. 1A, the plurality of cutting bodies 3, 13, 23 are arranged on the circumferential surface 21 of the main body 2. The circumferential surface 21 of the main body 2 has substantially the form of a lateral surface of a cylinder. As a deviation from the form of the lateral surface of a cylinder, the circumferential surface 21 has recesses 11. The recesses 11 are provided for receiving the cutting bodies 3, 13, 23. Provision may also be made for the cutting bodies to be arranged on the outermost circumferential surface and not in a recess. Provision may also be made for the cutting bodies to be arranged on an elevation of the circumferential surface. In the embodiment according to FIG. 1A, the plurality of cutting bodies 3, 13, 23 are arranged exclusively on the circumferential surface 21.

The cutting bodies 3, 13, 23 are fastened to the main body 2 as separate components. The cutting bodies 3, 13, 23 are soldered onto the main body. Provision may also be made for the cutting bodies to be fastened to the main body in a releasable manner. However, provision may also be made for the cutting bodies to be formed integrally and materially integrally with the main body.

During operation, the machining tool 1 rotates about the axis of rotation 50 in a direction of rotation 49. The direction of rotation 49 runs in the form of a circle around the axis of rotation 50. The direction of rotation 49 is also referred to as circumferential direction of the machining tool 1. During machining using the machining tool 1, cutting edges 4, 14, 24 assigned to the plurality of cutting bodies 3, 13, 23 rotate in the direction of rotation 49.

Figure 1B:
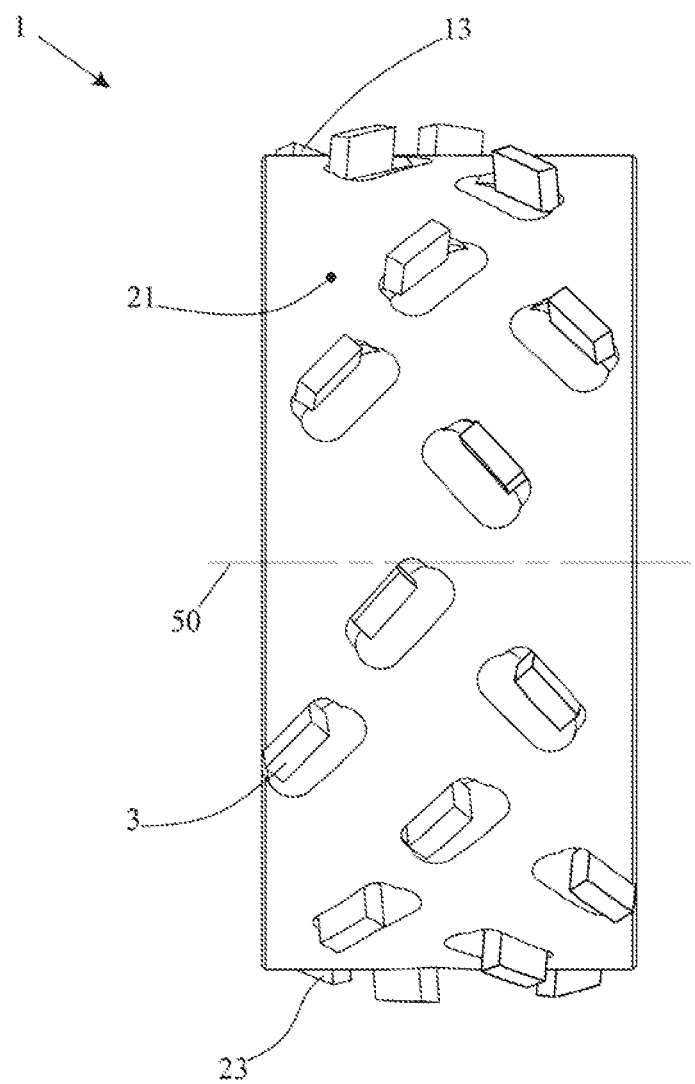
FIG. 1B shows a side view of the circumferential side of the machining tool from FIG. 1A in the radial direction with respect to the axis of rotation.

FIG. 1B shows a side view of the machining tool 1 from FIG. 1A in the radial direction with respect to the axis of rotation 50.

Figure 2A:
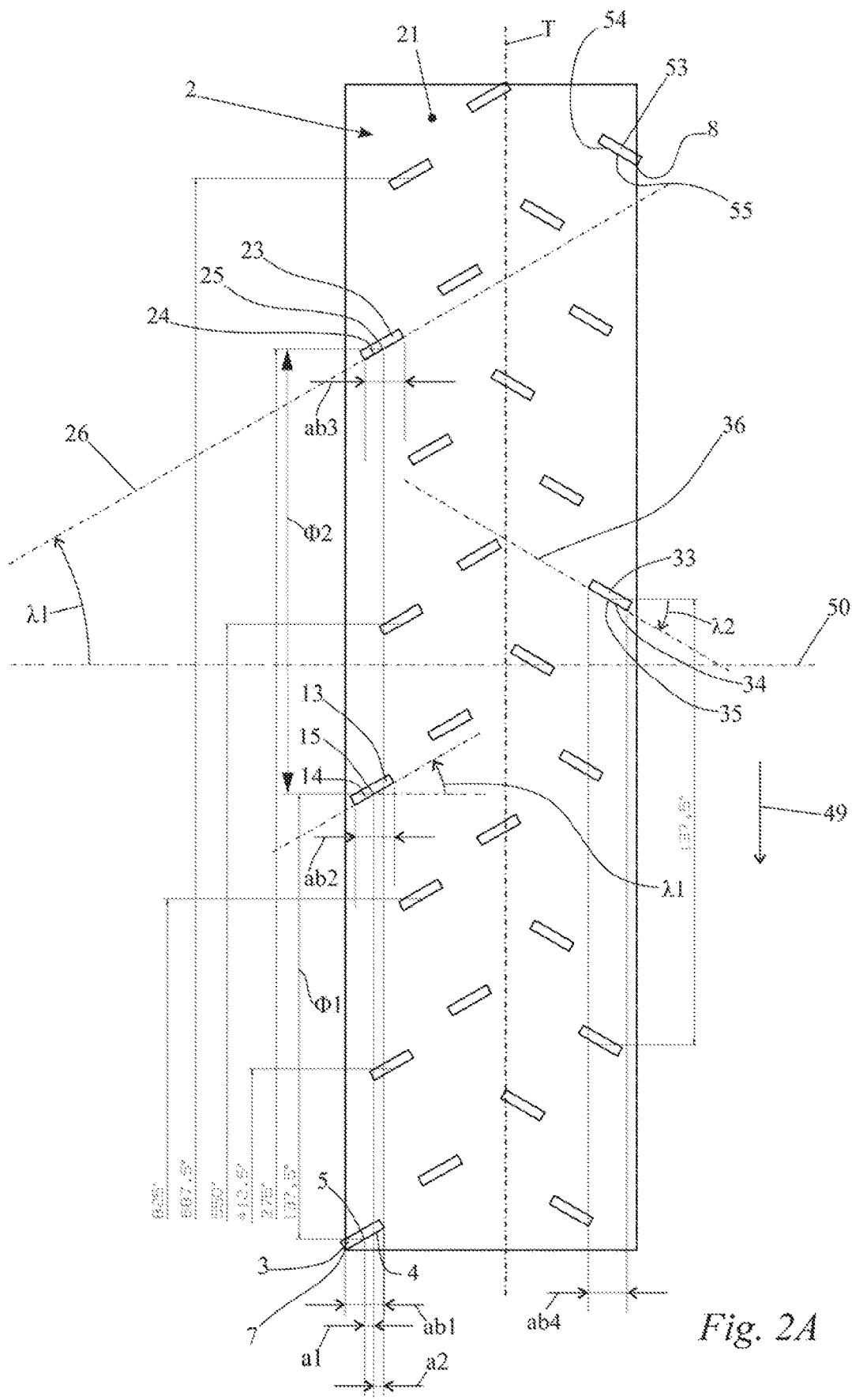
FIGS. 2A, 2B show schematic developed views of the circumferential side of the machining tool from FIGS. 1A and 1B, the developed view showing the outer side, unfolded about the axis of rotation, spread out in the plane of the drawing looking at the outer side.

FIG. 2A shows a schematic developed view of the circumferential surface 21 from FIGS. 1A and 1B. The circumferential surface 21 has been unfolded about the axis of rotation 50 in the plane of the drawing. FIG. 2A shows the developed view looking at the outer side of the circumferential surface 21. The plurality of cutting bodies 3, 13, 23 are illustrated schematically. Each of the plurality of cutting bodies 3, 13, 23 has a respective cutting edge 4, 14, 24. The first cutting body 3 has the first cutting edge 4. The second cutting body 13 has the second cutting edge 14. The third cutting body 23 has the third cutting edge 24. The cutting edges 4, 14, 24 are arranged at the front of the cutting body 3, 13, 23 assigned thereto with respect to the direction of rotation 49.

Each cutting edge 4, 14, 24 of the plurality of cutting bodies 3, 13, 23 has a reference point 5, 15, 25. The first cutting edge 4 has the first reference point 5. The second cutting edge 14 has the second reference point 15. The third cutting edge 24 has the third reference point 25. The reference point 5, 15, 25 is a defined point on the assigned cutting edge 4, 14, 24. The various reference points 5, 15, 25 are each positioned identically on the cutting edges 4, 14, 24 respectively assigned thereto. By way of example, the reference points may in each case be the leading cutting edge corner. In the embodiments, the reference point 5, 15, 25 is the center of the assigned cutting edge 4, 14, 24 with respect to the direction perpendicular to the direction of rotation 49, in particular with respect to the direction of the axis of rotation 50 and/or the radial direction with respect to the axis of rotation 50. The reference point is arranged at the same, distinguished location on each cutting edge. The locations at which the reference points are arranged have the same properties for each cutting edge of the plurality of cutting bodies 3, 13, 23.

The reference points 5, 15, 25 are spaced apart from one another in the direction perpendicular to the direction of rotation 49. In the embodiment according to FIG. 2A, the first reference point 5 has the first axial spacing a1 to the second reference point 15. The second reference point 15 has the second axial spacing a2 to the third reference point 25. In the embodiments, the reference points 5, 15, 25 are spaced apart from one another with respect to the axis of rotation 50. Correspondingly, the axial spacings a1, a2 are measured in the direction of the axis of rotation 50.

With respect to the direction of the axis of rotation 50, the first reference point 5, which is assigned to the first cutting body 3, is spaced apart directly from the second reference point 15, which is assigned to the second cutting body 13. Reference points of the plurality of cutting bodies 3, 13, 23 are directly adjacent when imaginary planes perpendicular to the axis of rotation 50 and through the associated reference points 5, 15, 25 are directly adjacent. This does not rule out the possibility of a reference point of a cutting edge that does not belong to the plurality of cutting bodies, that is, that does not have the properties of the plurality of cutting bodies, lying between two directly adjacent reference points of cutting edges of the plurality of cutting bodies. With respect to the direction of the axis of rotation 50, the second reference point 15 is directly adjacent to the third reference point 25, which is assigned to the third cutting body 23.

Reference points 5, 15, 25 of the plurality of cutting bodies 3, 13, 23 that are directly adjacent with respect to the direction of the axis of rotation 50 are arranged with an axial spacing a1, a2 to one another.

In the embodiments (for example FIG. 2A), the cutting edges 4, 14, 24 of the plurality of cutting bodies 3, 13, 23 overlap with respect to the direction perpendicular to the direction of rotation 49, in particular with respect to the direction of the axis of rotation 50. For overlapping cutting edges, there exists an imaginary plane perpendicular to the direction of the direction of rotation 49, in the embodiments perpendicular to the axis of rotation 50, which the two overlapping cutting edges intersect.

The cutting edges 4, 14, 24 of the plurality of cutting bodies 3, 13, 23 overlap in a gapless manner with respect to the direction perpendicular to the direction of rotation 49, in particular with respect to the direction of the axis of rotation, and thus form an overall cutting edge. The overall cutting edge has a first end point 7 and a second end point 8. The first end point 7 and the second end point 8 delimit the overall cutting edge at the opposite longitudinal ends thereof. In the embodiments, all of the cutting bodies of the machining tool 1 belong to the plurality of cutting bodies 3, 13, 23. However, provision may also be made of cutting bodies that do not belong to the plurality of cutting bodies, for example because they are not arranged with the corresponding angular spacing to the other cutting bodies. In each case, the cutting edges of all of the cutting bodies of the machining tool 1 are arranged between the first end point 7 and the second end point 8 of the overall cutting edge. In the embodiment according to FIGS. 2A and 2B, a first imaginary delimiting plane runs through the first end point 7 and a second imaginary delimiting plane runs through the second end point 8. The first delimiting plane and the second delimiting plane each run perpendicular to the axis of rotation 50. The cutting edges of all of the cutting bodies of the machining tool 1 are arranged between the first delimiting plane and the second delimiting plane.

An initial cutting body is assigned to the first end point 7. In the embodiment according to FIGS. 2A and 2B, the initial cutting body is the first cutting body 3. A final cutting body 53 is assigned to the second end point 8.

Figure 2B:
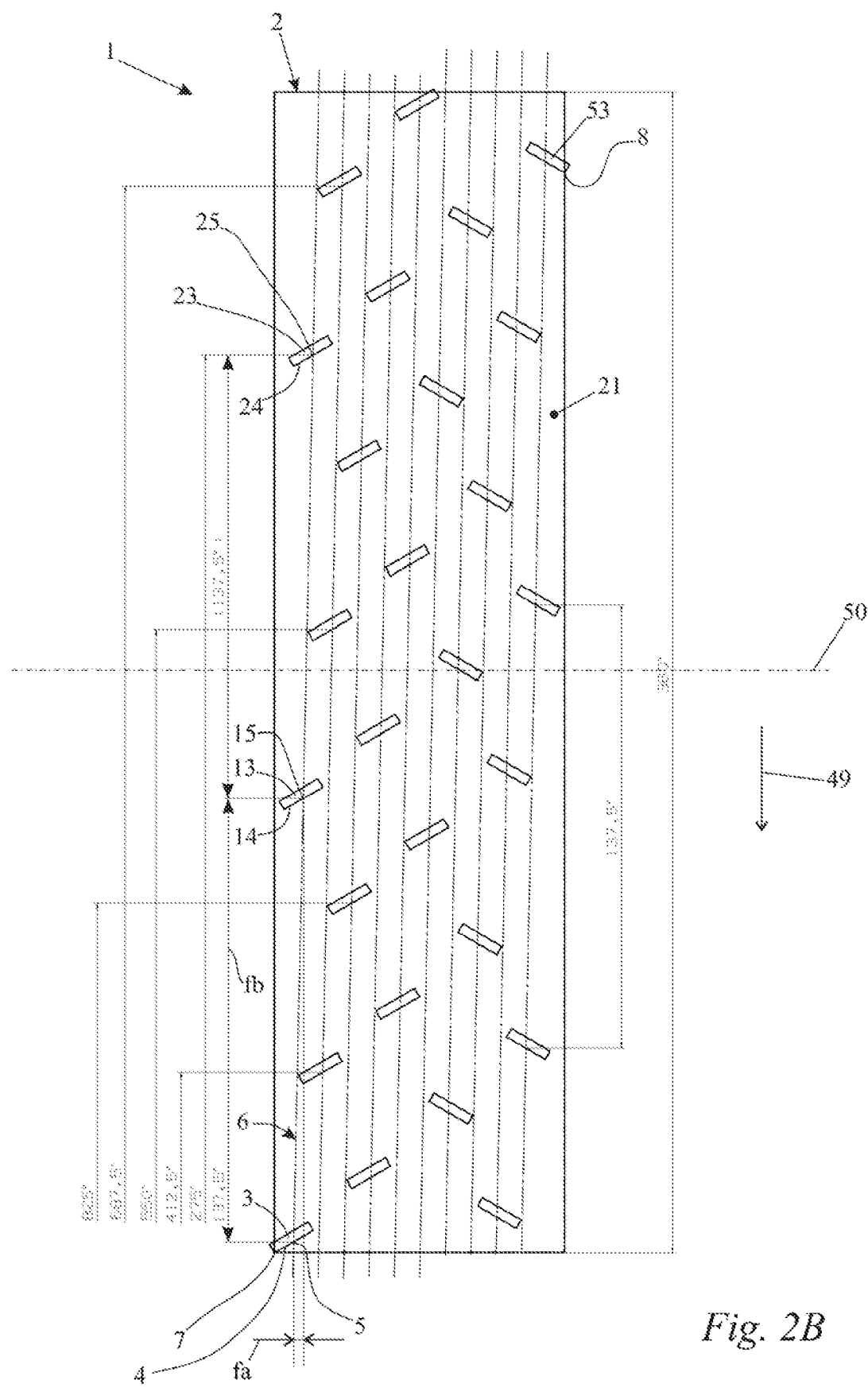
Figure 2C:
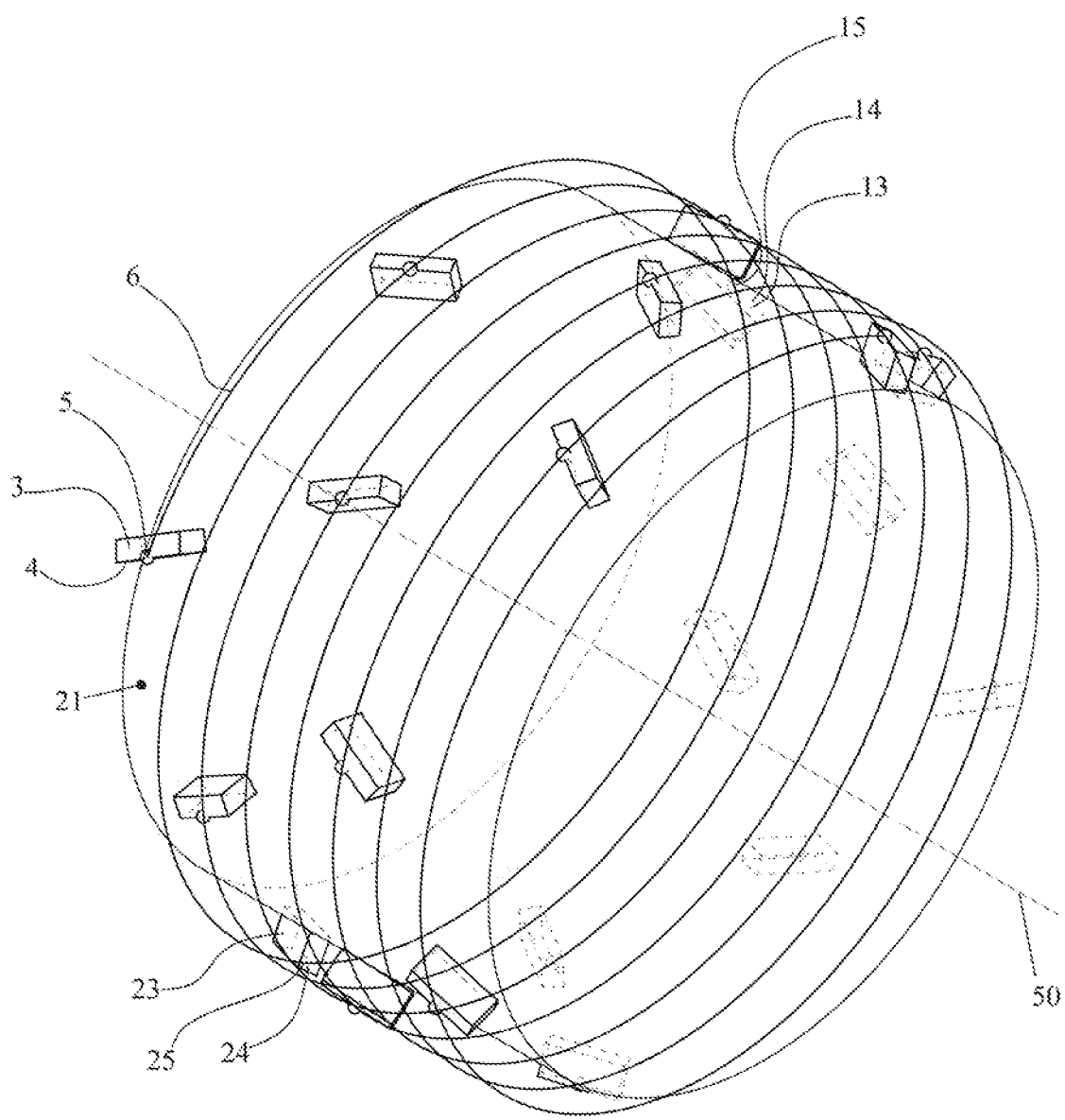
FIG. 2C shows a schematic perspective illustration of the arrangement of the cutting edges of the machining tool from FIGS. 1A and 1B on an imaginary helix line.
Figure 2D:
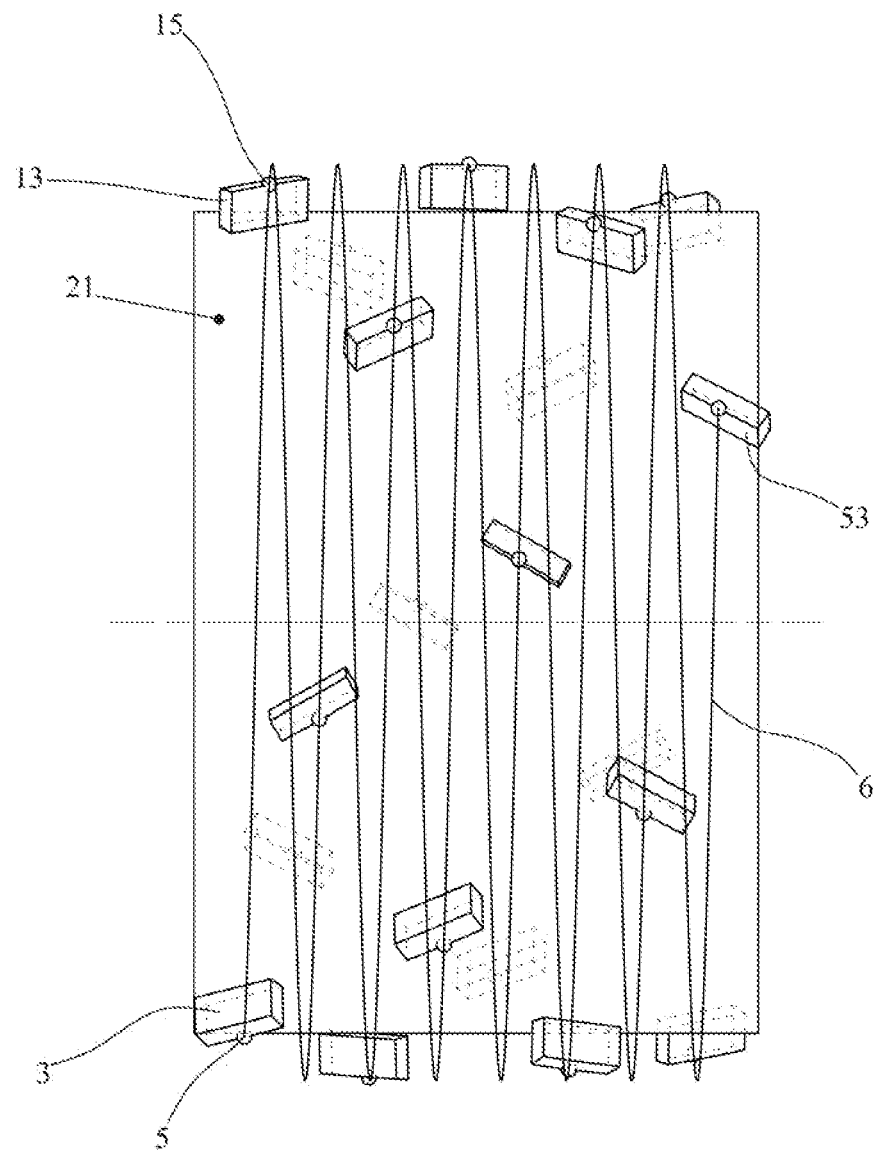
FIG. 2D shows a schematic side view of the arrangement of the cutting edges of the machining tool from FIGS. 1A and 1B on an imaginary helix line.
Figure 2E:
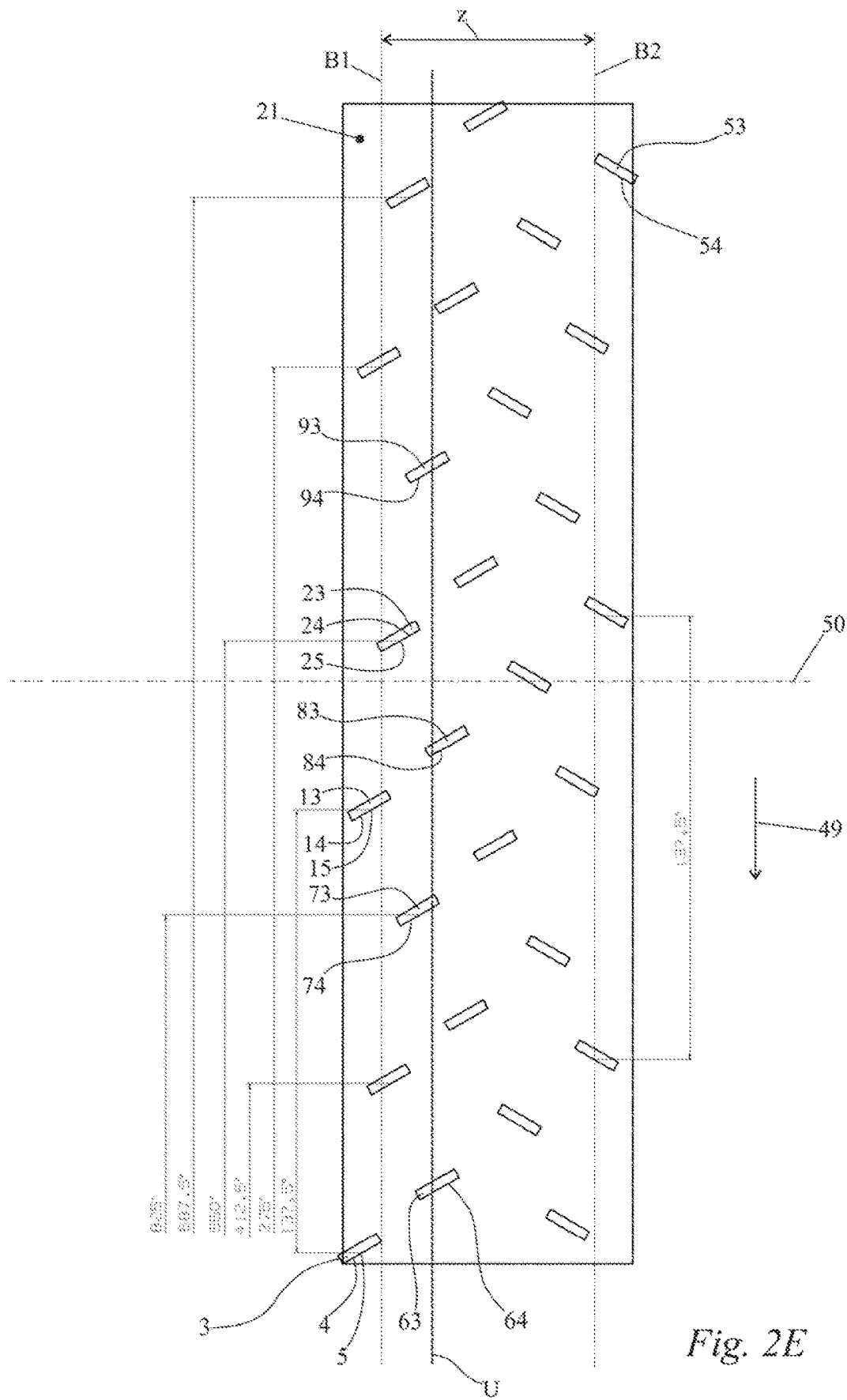
FIG. 2E shows the schematic developed views from FIGS. 2A and 2B.
Figure 3:
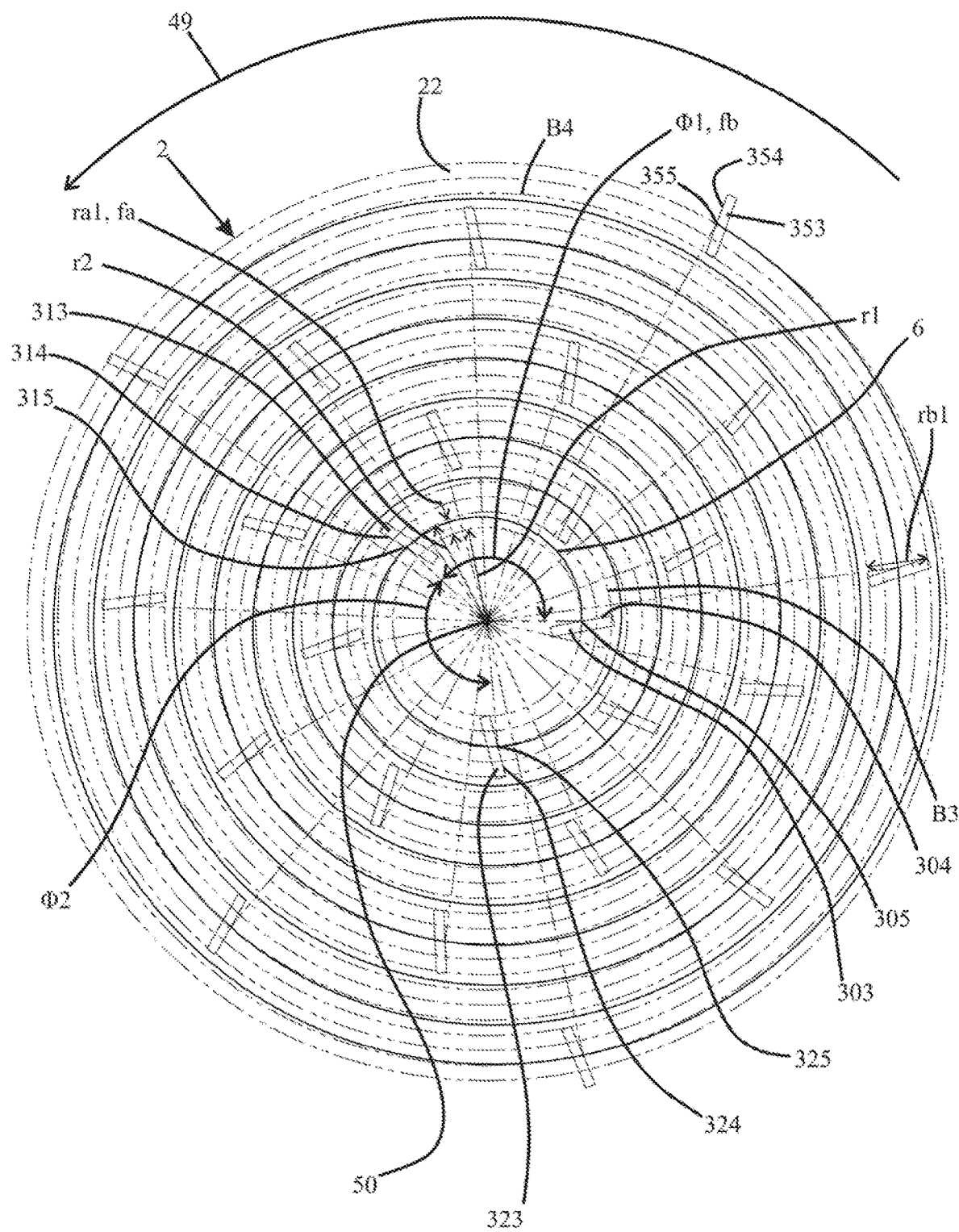
FIG. 3 shows a schematic side view of a machining tool, in which the plurality of cutting bodies are arranged on an imaginary helix line in the form of a planar spiral.

The cutting edges 4, 14, 24 of the plurality of cutting bodies 3, 13, 23 of the overall cutting edge in each case only partially overlap with respect to the direction perpendicular to the direction of rotation 49, in the embodiments with respect to the direction of the axis of rotation 50 (FIGS. 1A, 1B, 2A, 2B, 2C, 2D, 2E, 4, 5) or with respect to the radial direction with respect to the axis of rotation 50 (FIG. 3). Provision may also be made for the cutting edges 4, 14, 24 of the plurality of cutting bodies 3, 13, 23 of the overall cutting edge to in each case only partially overlap with respect to the direction of the axis of rotation 50 and with respect to the radial direction with respect to the axis of rotation 50.

The cutting edges 4, 14, 24 have a width measured perpendicular to the direction of rotation 49. In the embodiment according to FIG. 2A, the widths of all of the plurality of cutting edges 4, 14, 24 are of equal size. The widths extend in the direction of the axis of rotation 50 and are referred to as axial widths ab1, ab2, ab3. The axial widths ab1, ab2, ab3 are measured in the direction of the axis of rotation 50. The first axial width ab1 is the width of the first cutting edge 4. The second axial width ab2 is the width of the second cutting edge 14. The third axial width ab3 is the width of the third cutting edge 24.

The first axial spacing a1 between the first reference point 5 and the second reference point 15 is from 1% to 100%, in particular from 8% to 100%, in particular from 8% to 55%, in particular from 8% to 35%, in particular from 10% to 35%, in the embodiment from 10% to 30%, of the greatest axial width ab3, or ab1 or ab2, of the cutting edges 4, 14, 24 of the plurality of cutting bodies 3, 13, 23.

The first axial spacing a1 between the first reference point 5 and the second reference point 15 is from 1% to 100%, in particular from 8% to 100%, in particular from 8% to 55%, in particular from 8% to 35%, in particular from 10% to 35%, in the embodiment from 10% to 30%, of the mean value of the axial widths ab1, ab2, ab3 of all of the cutting edges 4, 14, 24 of the plurality of cutting bodies 3, 13, 23.

In the embodiment according to FIG. 2A, all of the axial widths ab1, ab2, ab3 of the cutting edges 4, 14, 24 of all of the plurality of cutting bodies 3, 13, 23 are of equal size. The axial spacings a1, a2 between all of the reference points 5, 15, 25 of the plurality of cutting bodies 3, 13, 23 that are directly adjacent in the direction perpendicular to the direction of rotation 49, in the embodiment in the direction of the axis of rotation 50, are of equal size. Correspondingly, the stated ratios also apply to the second axial spacing a2 (and all of the remaining axial spacings) in relation to the greatest axial width ab3, or ab1 or ab2, or, respectively, in relation to the mean value of the axial widths ab1, ab2, ab3 of all of the cutting edges 4, 14, 24 of the plurality of cutting bodies 3, 13, 23.

All of the cutting edges 4, 14, 24 of the plurality of cutting bodies 3, 13, 23 with reference points 5, 15, 25 that are directly adjacent with respect to the direction perpendicular to the direction of rotation 49, in the embodiment according to FIG. 2A with respect to the direction of the axis of rotation 50, overlap with respect to the direction perpendicular to the direction of rotation 49, in the embodiment according to FIG. 2A with respect to the direction of the axis of rotation 50.

As illustrated in FIG. 2A, the reference points 5, 15, 25 have an angular spacing $\phi 1$, $\phi 2$ to one another. The first reference point 5 is arranged with a first angular spacing $\phi 1$ to the second reference point 15. The second reference point 15 is arranged with a second angular spacing $\phi 2$ to the third reference point 25. The first angular spacing $\phi 1$ is measured with respect to the axis of rotation 50. In terms of magnitude, the first reference point 5 has the same angular spacing to the second reference point 15 as the second reference point 15 to the third reference point 25. The first angular spacing $\phi 1$ is measured in a plane perpendicular to the axis of rotation 50 about the axis of rotation 50. The second angular spacing $\phi 2$ is measured with respect to the axis of rotation 50. The second angular spacing $\phi 2$ is measured in a plane perpendicular to the axis of rotation 50 about the axis of rotation 50. The second angular spacing $\phi 2$ is the same size as the first angular spacing $\phi 1$. The first angular spacing $\phi 1$ is measured between the reference points 5 and 15 which are directly adjacent in the direction perpendicular to the direction of rotation 49. The second angular spacing $\phi 2$ is measured between the reference points 15 and 25 which are directly adjacent in the direction perpendicular to the direction of rotation 49.

The angular spacings $\phi 1$ and $\phi 2$ are each integer multiples of angle values. The angle values lie in an angle range.

The angle range extends from 10° to 350°, in particular from 30° to 330°, in particular from 60° to 270°, preferably from 90° to 180°.

In the embodiment, the angle range extends +/−5° around the golden angle. The angle range extends from a first limit value up to a second limit value. The first limit value corresponds to the difference between the magnitude of the golden angle and 5°. The second limit value corresponds to the sum of the magnitude of the golden angle and 5°. The golden angle lies within the angle range and is included therein.

In the embodiments, the angular spacings $\phi 1$, $\phi 2$ are each an integer multiple of a fixed angle value. The term "fixed angle value" in this context means that a single angle value is selected from the angle range, the angular spacings $\phi 1$ and $\phi 2$ being determined on the basis of the angle value. However, provision may also be made for different angle values to be selected from the angle range for different angular spacings.

The set of integer multiples also includes the singular multiple. The angular spacing $\phi 1$, $\phi 2$ may also correspond to one times the angle value. This is the case in the embodiments. The angle value lies in an angle range of +/−5° with respect to the golden angle. The golden angle is defined in that the sum of the golden angle and an opposite angle produce the round angle, and in that the ratio of golden angle to opposite angle is equal to the ratio of opposite angle to round angle. The round angle is 360°. The golden angle is about 137.5°. The angle range in which the angle value lies includes the golden angle. Provision may also be made for the angle value to be in an angle range of 132.5° to 142.5°. In the embodiments, the angle value lies in an angle range of +/−1° with respect to the golden angle. In the embodiments, the angle value lies in an angle range of 136.5° to 138.5°. In the embodiments, the angle value lies in an angle range of +/−0.5° with respect to the golden angle. In the embodiments, the angle value lies in an angle range of 137° to 138°.

Above the cutter carrier surface, an imaginary helix line 6, which is illustrated in dashed form in FIG. 2B, runs from the initial cutting body (in the embodiment according to FIG. 2A the first cutting body 3) as far as the final cutting body 53. The imaginary helix line 6 runs from the initial cutting edge to the final cutting edge in an interruption-free manner. The initial cutting edge is the cutting edge 4 of the cutting body 3. The final cutting edge is the cutting edge 54 of the cutting body 53. The helix line 6 is also illustrated in FIGS. 2C and 2D. The helix line 6 runs around a central axis. The central axis corresponds to the axis of rotation. The helix line 6 runs at least partially, in particular completely, in the embodiment multiple times, around the central axis. The helix line 6 has a progression fa in the direction perpendicular to the direction of rotation 49. The helix line 6 has a progression fb with regard to an angle of rotation about the axis of rotation 50 (FIG. 2B). The quotient fa/fb of the progression fa of the helix line 6 and of the progression fb of the helix line 6 corresponds to a gradient of the helix line 6, in particular the limits of the quotient fa/fb for fb toward zero. The quotient fa/fb, or its limits, indicates the gradient of the helix line 6 at each point thereof. Expediently, the gradient of the helix line 6 is greater than zero, in particular for each point of the helix line 6. In particular, the progression fa is proportional to the progression fb. This relationship between the progression fa and the progression fb applies in particular to any desired point of the helix line 6. In the embodiment, the helix line 6 has a constant gradient. However, provision may also be made for the helix line to have different gradients with respect to the direction perpendicular to the direction of rotation 49. Provision may also be made for the helix line 6 to have a jump in gradient. In the embodiment according to FIGS. 2A to 2D, the progression fa of the helix line 6 in the direction of the axis of rotation 50 is proportional to the progression fb of the helix line 6 with regard to the angle of rotation about the axis of rotation 50. In the embodiment according to FIGS. 2A, 2B, 2C, 2D, 2E, the helix line has the form of a helix. The helix is also referred to as screw line or as cylindrical spiral. However, depending on the form of the cutter carrier surface, other forms for the helix line may also be provided. By way of example, the helix line may have the form of a planar spiral (like the helix line 6 in the embodiment according to FIG. 3). In the case of a conical form of the cutter carrier surface, the helix line has the form of a conical spiral. In the case of a corrugated contour of the cutter carrier surface with respect to the direction perpendicular to the direction of rotation, the form of the helix line may vary in terms of radius.

The helix line 6 runs substantially with a constant spacing to the cutter carrier surface. All of the cutting edges of the machining tool 1 pass over an enveloping surface during rotation of the machining tool 1. The helix line 6 runs in this enveloping surface. In the embodiment according to FIG. 2C, the enveloping surface is the lateral surface of a cylinder. However, provision may be made for the enveloping surface to be any other surface of revolution. This is for example the case in the case of a contour cutter. In this case, the spacing of the helix line to the axis of rotation with respect to the direction of the axis of rotation varies. The progression of the helix line in the direction perpendicular to the direction of rotation is then measured along the enveloping surface in a plane containing the axis of rotation 50. Here, the path integral of the cutting line between this plane and the enveloping surface is determined from a starting point on the helix line as far as a progression point. The angular spacing between the progression point and a point of intersection of the plane with the helix line, the angular spacing being measured in a plane perpendicular to the axis of rotation and through the progression point, defines the progression of the helix line with regard to an angle of rotation. The enveloping surface runs substantially with a constant spacing to the cutter carrier surface.

The helix line 6 has a central axis around which it runs. The central axis corresponds to the axis of rotation 50 (FIG. 2C). Provision may be made for the helix line to run only partially, that is, over less than 360°, around the axis of rotation. In the embodiments, the helix line 6 runs around the axis of rotation 50 multiple times.

The cutting edges 4, 14, 24 of all of the plurality of cutting bodies 3, 13, 23 are at least partially arranged on the helix line 6 (FIG. 2C). Cutting edges 4, 14, 24 of reference points 5, 15, 25, which are directly adjacent in the direction perpendicular to the direction of rotation 49, of the plurality of cutting bodies 3, 13, 23 are directly adjacent on the helix line 6.

In the embodiment according to FIGS. 2A, 2B, 2C, 2D, 2E, the reference points 5, 15, 25 of the cutting edges 4, 14, 24 of all of the plurality of cutting bodies 3, 13, 23 are arranged in a helix region (not illustrated) extending in the direction perpendicular to the direction of rotation 49 on both sides of the helix line 6. In the direction perpendicular to the direction of rotation 49, in particular in the direction of the axis of rotation 50, the helix region extends over a helix width of 100%, in particular of 75%, in particular of 50%, in particular of 25%, in particular of 10%, of the mean value of all of the axial widths of the cutting edges 4, 14, 24 of the plurality of cutting bodies 3, 13, 23. The helix line 6 divides the helix region into two halves of equal size.

The machining tool 1 includes only a single group of a plurality of cutting bodies 3, 13, 23, the cutting edges 4, 14, 24 of which overlap, between the end points 7, 8 of the overall cutting edge, in a gapless manner with respect to the direction perpendicular to the direction of rotation 49 and the cutting edges 4, 14, 24 of which are at least partially arranged on a helix line 6.

In the embodiment according to FIGS. 2A, 2B, 2C, 2D, 2E, the reference points 5, 15, 25 of the cutting edges 4, 14, 24 of all of the plurality of cutting bodies 3, 13, 23 are arranged on the imaginary helix line 6 running around the axis of rotation 50.

In particular, other than the plurality of cutting bodies 3, 13, 23, the cutting edges 4, 14, 24 of which are at least partially arranged on the imaginary helix line 6, no further cutting bodies are arranged on the main body 2. However, it may be provided that, other than the plurality of cutting bodies 3, 13, 23, the cutting edges 4, 14, 24 of which are at least partially arranged on the imaginary helix line 6, further cutting bodies are arranged on the main body 2.

Provision may be made for at least a first group of a plurality of cutting bodies and a second group of a plurality of cutting bodies to be arranged on the main body of the machining tool. The plurality of cutting bodies assigned to a group may each individually have all or only some of the above-described properties of the plurality of cutting bodies. In particular, an imaginary first helix line assigned to the first group runs around the axis of rotation in the opposite direction of rotation to a second helix line assigned to the second group. The first helix line and the second helix line have the above-described properties of the helix line 6. The cutting edges of the plurality of cutting bodies of the first group that are assigned to the first helix line and the cutting edges of the plurality of cutting bodies of the second group that are assigned to the second helix line are positioned as described above in connection with FIGS. 2A, 2B, 2C with respect to the respective helix line.

FIG. 2E shows the illustration from FIG. 2A. The cutting edge 4 of the cutting body 3 is the initial cutting edge of the overall cutting edge which is formed from the plurality of cutting bodies 3, 13, 23. The cutting edge 54 of the cutting body 53 is the final cutting edge of the overall cutting edge. That region of the overall cutting edge which lies completely between the initial cutting edge and the final cutting edge with respect to the direction perpendicular to the direction of rotation 49, in the embodiment according to FIG. 2E in the direction of the axis of rotation 50, forms an intermediate region of the overall cutting edge. The intermediate region extends between the end points of the initial cutting edge and of the final cutting edge, the end points facing one another with respect to the direction perpendicular to the direction of rotation 49, in the embodiment with respect to the direction of the axis of rotation 50. In FIG. 2E, dashed delimiting surfaces B1 and B2 are depicted, which each extend perpendicular to the direction perpendicular to the direction of rotation 49, in FIGS. 2A to 2E perpendicular to the axis of rotation 50. In FIG. 2E, the delimiting surfaces B1 and B2 are planes. However, another form for the delimiting surfaces may also be provided. In the embodiment according to FIG. 3, the form of the delimiting surfaces B3 and B4 corresponds to that of the lateral surface of a cylinder. In FIG. 2E, the intermediate region of the overall cutting edge extends over a width z. The region which lies behind the initial cutting edge (cutting edge 4) in the direction of rotation 49 and behind the final cutting edge (cutting edge 54) in the direction of rotation 49 does not belong to the intermediate region of the overall cutting edge. The overall cutting edge includes cutting edges which lie completely between the initial cutting edge and the final cutting edge. With respect to the direction perpendicular to the direction of rotation 49, further cutting edges lie only partially in the intermediate region. In FIG. 2E, by way of example the cutting edges 24 and 34 lie only partially in the intermediate region. The cutting edges 64, 74, 84 and 94 lie completely in the intermediate region.

The group of the plurality of cutting bodies 3, 13, 23, which form an overall cutting edge and are arranged on the same helix line 6, have a minimum number of teeth. The minimum number of teeth is the number of cutting edges 24, 34, 64, 74, 84, 94, which are at least situated one behind the other in the direction of rotation 49 in the intermediate region of the overall cutting edge, of the group of the plurality of cutting bodies 3, 13, 23 which form the overall cutting edge. When ascertaining the minimum number of teeth, exactly one full revolution through 360° with respect to the axis of rotation 50 is taken into consideration. Each cutting edge is counted only once. When counting, cutting edges which only project into the intermediate region of the overall cutting edge are also taken into consideration. When counting, cutting edges which are only partially arranged in the intermediate region of the overall cutting edge are also taken into consideration. Cutting edges which do not belong to the plurality of cutting bodies are not taken into consideration when ascertaining the minimum number of teeth.

In the embodiment according to FIG. 2E, the minimum number of teeth corresponds to the number of cutting edges 24, 34, 64, 74, 84, 94 of the plurality of cutting bodies 3, 13, 23 that at least intersects a section plane U which is arranged in any desired manner between the delimiting surfaces B1 and B2 and which runs perpendicular to the axis of rotation 50.

In other words, the minimum number of teeth corresponds to the number of cutting edges 64, 74, 84, 94 of the plurality of cutting bodies 3, 13, 23 that at least intersects a circle which is arranged in any desired manner completely between initial cutting edge and final cutting edge of the overall cutting edge with respect to the direction perpendicular to the direction of rotation. Here, the circle runs in a plane perpendicular to the axis of rotation 50 in the direction of rotation 49 around the axis of rotation 50. The circle runs on the enveloping surface of all of the cutting edges of the machining tool. In particular, a radius of the circle corresponds to the spacing of the cutting edges of the plurality of cutting bodies to the axis of rotation at the level of the circle.

The cutting edges of the group of the plurality of cutting bodies 3, 13, 23 overlap with respect to the direction perpendicular to the direction of rotation 49 in such a way that the minimum number of teeth is at least two, in particular at least three. In the embodiments, the minimum number of teeth is four. Provision may also be made for the minimum number of teeth to be from 2 to 16, in particular from 2 to 8, in particular from 4 to 8.

It may be provided that, other than the plurality of cutting bodies, the machining tool also includes further cutting bodies, the cutting edges of which have reference points with angular spacings to one another that differ from those of the reference points of the cutting edges of the plurality of cutting bodies. This is not the case in the embodiment.

In FIGS. 2A and 2B, any desired cutting edge 4, 14, 24 from all of the plurality of cutting bodies 3, 13, 23 may be selected as reference cutting edge. The reference point 5, 15, 25 of this arbitrarily selected reference cutting edge has angular spacings φ1, φ2 to the reference points of the cutting edges of all of the remaining cutting bodies 3, 13, 23 of the machining tool 1, the angular spacings corresponding to an integer multiple of the fixed angle value.

In the embodiment according to FIGS. 2A and 2B, all of the reference points 5, 15, 25, which are directly adjacent to one another in the direction perpendicular to the direction of rotation 49, in the embodiment in the direction of the axis of rotation 50, of all of the plurality of cutting bodies 3, 13, 23 are arranged with an equal angular spacing in terms of magnitude. Other than the plurality of cutting bodies 3, 13, 23, no further cutting bodies are arranged on the main body 2.

A cutting body which belongs to the plurality of cutting bodies 3, 13, 23 has at least one of the following properties:
the angular spacing of the reference point of its cutting edge to a reference point, spaced apart in the direction perpendicular to the direction of rotation, of a further cutting edge is a multiple of the angle value, or
it is arranged on an imaginary helix line and its cutting edge is required to form, together with further cutting edges arranged on the helix line, the overall cutting edge with cutting edges which overlap in a gapless manner with respect to the direction perpendicular to the direction of rotation and with the minimum number of teeth of two.

Proceeding from the first reference point 5 of the first cutting edge 4 of the first cutting body 3, the second reference point 15, which is directly adjacent in the direction perpendicular to the direction of rotation 49, of the second cutting edge 14 of the second cutting body 13 is arranged on the main body 2 so as to be offset by the magnitude of the angular spacing φ1 and the axial spacing a1. In the embodiment according to FIG. 2A, the magnitudes of the angular spacing φ1 between the first reference point 5 and the second reference point 15 which is directly adjacent in the direction perpendicular to the direction of rotation 49 and of the angular spacing φ2 between the second reference point 15 and the third reference point 25 which is directly adjacent in the direction perpendicular to the direction of rotation 49 are of equal size. In the embodiment according to FIG. 2A, the magnitudes of the axial spacing a1 between the first reference point 5 and the second reference point 15 which is directly adjacent in the direction perpendicular to the direction of rotation 49 and of the axial spacing a2 between the second reference point 15 and the third reference point 25 which is directly adjacent in the direction perpendicular to the direction of rotation 49 are of equal size. The third reference point 25 which is directly adjacent to the second reference point 15 in the direction perpendicular to the direction of rotation 49 is arranged on the main body 2 so as to be offset in relation to the second reference point 25 by the magnitude of the angular spacing φ1 or by the magnitude of the angular spacing φ2 and the magnitude of the axial spacing a1 or the magnitude of the axial spacing a2, respectively. In the embodiment according to FIGS. 2A and 2B, all of the successively arranged cutting bodies are arranged on the main body 2 in accordance with this pattern. The magnitudes of all of the angular spacings of reference points which are directly adjacent in the direction perpendicular to the direction of rotation are of equal size in the embodiment. The magnitudes of all of the axial spacings of reference points which are directly adjacent in the direction perpendicular to the direction of rotation are of equal size in the embodiment.

As schematically illustrated in FIG. 2A, the cutting edges 4, 14, 24 of the plurality of cutting bodies 3, 13, 23 may each run in a rectilinear manner. In the case of a curved profile of the cutting edge, a tangent to the cutting edge may be placed at the reference point. In FIG. 2A, tangents have been created at the schematically illustrated cutting edges 24 and 34. The tangents 26 and 36 each run through the reference point. In a view in the radial direction with respect to the axis of rotation 50 and of a reference point 5, 15, 25 of the plurality of cutting bodies 3, the respective cutting edge 4, 14, 24 or its tangent 26, 36 is tilted in relation to the axis of rotation 50 by an axis angle λ1, λ2. In particular, the tangent 26, 36 runs in the direction perpendicular to the radial direction with respect to the axis of rotation 50. The axis angle λ1, λ2 lies between −90° and +90°. The axis angle λ1, λ2 is the smaller of the two angles between the cutting edge 4, 14, 24 and a plane perpendicular to the direction of rotation 49 through the reference point 5, 15, 25. The positive axis angle λ2 is measured counterclockwise in relation to the outer side of the cutter carrier surface. The negative axis angle λ1 is measured clockwise in relation to the outer side of the cutter carrier surface. In the embodiment, one portion of the cutting edges 4, 14, 24 of the plurality of cutting bodies 3, 13, 23 has the axis angle λ2 of greater than 0°, and the other portion has an axis angle λ1 of smaller than 0°.

The axis angles λ1, λ2 can assume values of −90° to +90°.

In a view radially with respect to the axis of rotation 50 and in a view of the respective reference point 5, 15, 25 of the respective tilted cutting edge 4, 14, 24, the axis of rotation 50 lies in a plane with the reference point 5, 15, 25. The axis angle λ1, λ2 is the angle between the cutting edge 4, 14, 24 and this plane.

The first axis angle λ1 is from greater than 0° to 90°, in the embodiment from 10° to 80°. The second axis angle λ2 is from −90° to smaller than 0°, in the embodiment from −80° to −10°. In the embodiments, the first axis angle λ1 and the second axis angle λ2 are of equal size in terms of magnitude.

One portion of the plurality of cutting bodies 3, 13, 23, 33 has cutting edges 4, 14, 24 with the first axis angle λ1. Another portion of the plurality of cutting bodies 3, 13, 23, 33 has cutting edges 34 with the second axis angle λ2. Provision may also be made for the cutting edges of all of the plurality of cutting bodies to be arranged with the same axis angle, for example with the axis angle λ1. Provision may also be made for the axis angles of the cutting edges of all of the plurality of cutting bodies to be of different size in terms of magnitude.

In FIG. 2A, a cutting body 33 with a cutting edge 34 and a reference point 35 is illustrated by way of example. The cutting edge 34 is oriented with the second axis angle λ2 in relation to the axis of rotation. The main body 2 has a separating plane T. The separating plane T extends perpendicularly with respect to the axis of rotation 50. The separating plane T divides the main body 2 into a first region and a second region. Cutting bodies 3, 13, 23 with cutting edges 4, 14, 24, the reference points 5, 15, 25 of which are arranged in the first region, are oriented with the first axis angle λ1 in relation to the axis of rotation 50. Cutting bodies 33 with cutting edges 34, the reference points 35 of which are arranged in the second region, are oriented with the second axis angle λ2 in relation to the axis of rotation 50. A change of sign of the assigned axis angle takes place between the first region and the second region. The axis angles are selected such that the cutting edges of the plurality of cutting bodies comb toward the interior of the main body 2 with respect to the direction of the axis of rotation 50.

FIG. 3 shows a schematic illustration of an alternative embodiment. The main body 2 also has a cylindrical form. The main body 2 is delimited by an end surface 22 in the direction of the axis of rotation 50. The plurality of cutting bodies 303, 313, 323 (likewise again only three of the great plurality of cutting bodies are numbered by way of example) are arranged on the end surface 22. The plurality of cutting bodies 303, 313, 323 have cutting edges 304, 314, 324. Each cutting edge 304, 314, 324 of the plurality of cutting bodies 303, 313, 323 has exactly one reference point 305, 315, 325. The reference point 305, 315, 325 lies in the center of the cutting edge 304, 314, 324 with respect to the direction perpendicular to the direction of rotation 49. In the embodiment according to FIG. 3, the reference point 305, 315, 325 lies in the center of the cutting edge 304, 314, 324 with respect to the radial direction with respect to the axis of rotation 50. In the embodiment according to FIG. 3, the direction perpendicular to the direction of rotation 49 runs in the radial direction with respect to the axis of rotation 50. Reference points 305, 315, 325, which are directly adjacent in the direction perpendicular to the direction of rotation, of the cutting edges 304, 314, 324 of the plurality of cutting bodies 303, 313, 323 are each arranged with angular spacings φ1, φ2 to one another with respect to the axis of rotation 50. For the angular spacings, the same applies as was described with respect to the embodiment according to FIGS. 2A to 2E.

The reference points 305, 315, 325 are spaced apart from one another in the radial direction with respect to the axis of rotation 50. The cutting edges 304, 314, 324 of reference points 305, 315, 325 which are directly adjacent in the direction perpendicular to the direction of rotation 49, that is, in the radial direction with respect to the axis of rotation 50, overlap in the direction perpendicular to the direction of rotation 49.

The cutting edges 304, 314, 324 of the plurality of cutting bodies 303, 313, 323 have radial widths rb1 measured in the radial direction with respect to the axis of rotation 50. The reference points 305, 315, 325 which are adjacent in the direction perpendicular to the direction of rotation 49 are arranged with a radial range spacing ra1 to one another. The radial range spacing ra1 corresponds to the difference between the larger radial spacing r2 and the smaller radial spacing r1 of the radially adjacent reference points 315 and 305. The radial spacing r1, r2 is the spacing of the reference point 305, 315 to the axis of rotation 50. The positions of the radial range spacings are visualized in FIG. 3 by dashed circles, which each run through the reference points.

In the embodiment according to FIG. 3, the radial range spacings ra1 between all of the reference points 305, 315, 325 which are directly adjacent in the direction perpendicular to the direction of rotation 49 are of equal size. However, provision may also be made for the radial range spacings to be of different size. The radial widths rb1 of all of the cutting edges 304, 314, 324 of the plurality of cutting bodies 303, 313, 323 are also of equal size. However, provision may also be made for the radial widths to be of different size.

The radial range spacing ra1 between the first reference point 305 and the second reference point 315 is from 1% to 100%, in particular from 8% to 100%, in particular from 8% to 55%, in particular from 8% to 35%, in particular from 10% to 35%, in the embodiment from 10% to 30%, of the greatest radial width rb1 of the cutting edges 304, 314, 324 of the plurality of cutting bodies 303, 313, 323.

The radial range spacing ra1 between the first reference point 305 and the second reference point 315 is from 1% to 100%, in particular from 8% to 100%, in particular from 8% to 55%, in particular from 8% to 35%, in particular from 10% to 35%, in the embodiment from 10% to 30%, of the mean value of the radial widths rb1 of all of the cutting edges 304, 314, 324 of the plurality of cutting bodies 303, 313, 323.

In the embodiment according to FIG. 3, the cutting edges 304, 314, 324 of the plurality of cutting bodies 303, 313, 323 also overlap in a gapless manner with respect to the direction perpendicular to the direction of rotation 49 and thus form an overall cutting edge. The first cutting edge 304 is an initial cutting edge of the overall cutting edge. The cutting edge 354 is a final cutting edge of the overall cutting edge. The overall cutting edge has an intermediate region. The intermediate region lies completely between the initial cutting edge and the final cutting edge with respect to the direction perpendicular to the direction of rotation 49, in FIG. 3 in the radial direction with respect to the axis of rotation 50. In FIG. 3, the intermediate region is delimited by the delimiting surfaces B3 and B4, which are illustrated as dashed lines. The delimiting surfaces B3 and B4 each have the form of a lateral surface of a cylinder. All of the cutting edges of the machining tool 1 are arranged, with respect to the direction perpendicular to the direction of rotation 49, between an end point assigned to the initial cutting edge and an end point, assigned to the final cutting edge, of the overall cutting edge.

On the end surface 22, an imaginary helix line 6 runs from the initial cutting edge as far as the final cutting edge. In contrast to the helix line described with respect to the embodiment according to FIGS. 2A, 2B, 2C, 2D, 2E, the helix line 6 according to FIG. 3 has the form of a planar spiral. Otherwise, it has all of the properties described there. The direction perpendicular to the direction of rotation 49 now extends in the radial direction and not in the axial direction. Correspondingly, a progression of the helix line 6 in the radial direction with respect to the axis of rotation 50 is proportional to a progression of the helix line 6 with regard to an angle of rotation about the axis of rotation 50. However, a varying gradient of the helix line 6 may also be provided.

The minimum number of teeth is defined in an analogous manner to FIGS. 2A, 2B, 2C, 2D, 2E. The smallest number of cutting edges lying in the intermediate region of the overall cutting edge on any desired circle (for example one of the dashed lines in the intermediate region in FIG. 3) running around the axis of rotation 50 corresponds to the minimum number of teeth. The cutting edges 304, 314, 324 of the plurality of cutting bodies 303, 313, 323 overlap with respect to the direction perpendicular to the direction of rotation 49, that is, with respect to the radial direction with respect to the axis of rotation 50, in such a way that the minimum number of teeth is at least two, in particular at least three, in the embodiment at least four. The cutting edges 304, 314, 324 of the plurality of cutting bodies 303, 313, 323 in each case only partially mutually overlap with respect to the direction perpendicular to the direction of rotation 49, in FIG. 3 in the radial direction with respect to the axis of rotation 50.

The embodiments according to FIGS. 2A, 2B, 2C, 2D, 2E and 3 may also be combined with one another. The cutting edges of the plurality of cutting bodies are then arranged on a helix line which, proceeding from an initial cutting edge arranged on the end surface of a cylindrical main body, first develops in the form of a planar spiral on the end surface and then continues in the form of a helix, arranged on the circumferential surface, as far as a final cutting edge. The continuation is effected in particular in a seamless manner.

Figure 4:
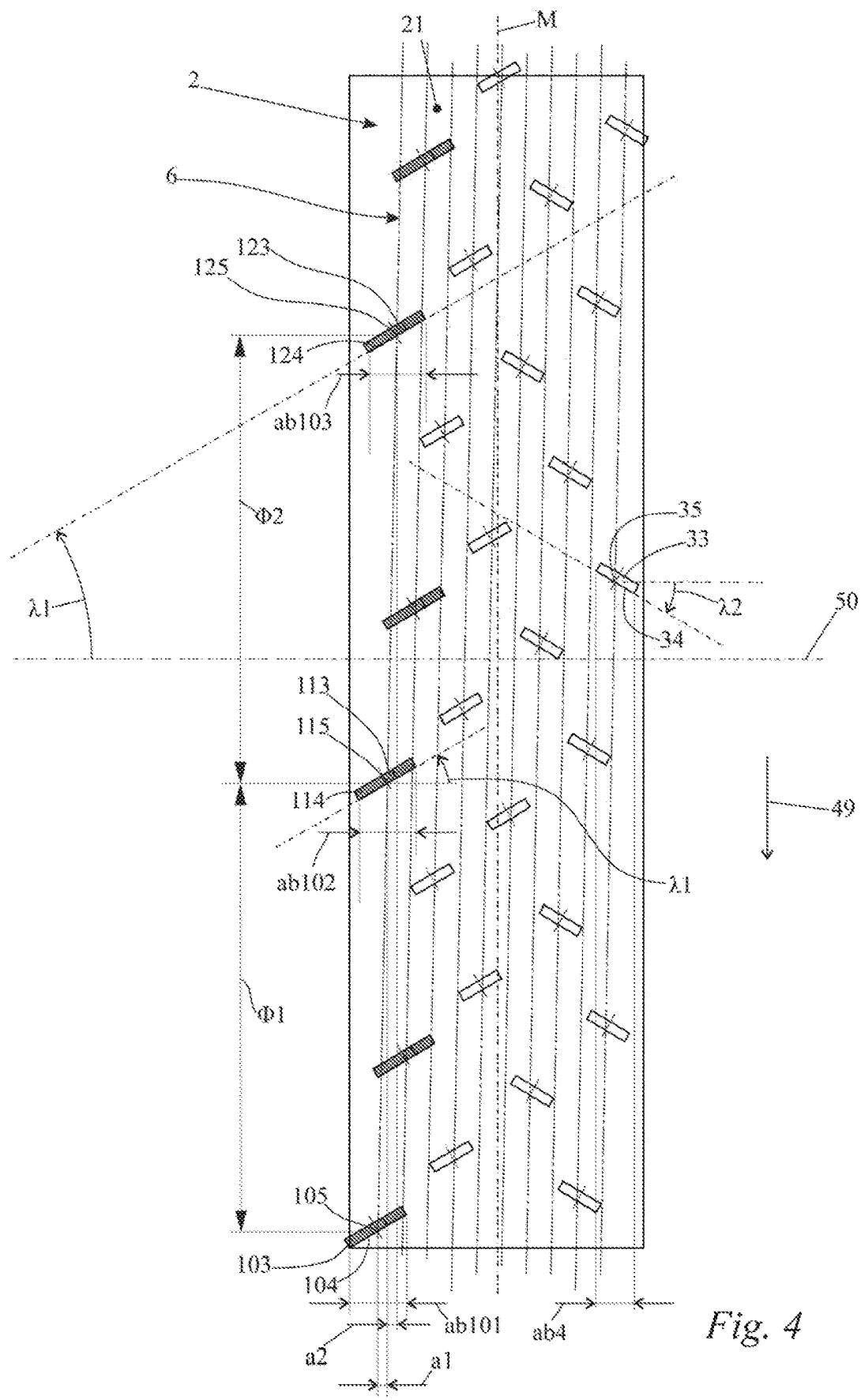
FIG. 4 shows a schematic developed view of an alternative embodiment of a machining tool with cutting edges of different axial widths.

FIG. 4 shows a schematic developed view of an alternative embodiment for a machining tool 1. The basic construction of the machining tool 1 according to FIG. 4 is identical to the basic construction of the machining tool 1 according to FIGS. 1A, 1B, 2A and 2B. Identical components or components which are arranged in an identical manner and identical variables are denoted by the same reference designations. With regard to the basic construction and to any configuration that is unchanged in relation to the embodiment according to FIGS. 1A, 1B, 2A and 2B, reference is made to the description relating to the embodiment according to FIGS. 1A, 1B, 2A and 2B. In the text which follows, only the differences between the embodiment according to FIG. 4 and the embodiment according to FIGS. 1A, 1B, 2A and 2B are described.

The machining tool 1 according to FIG. 4 differs from the embodiment according to FIGS. 1A, 1B, 2A and 2B by the configuration of the cutting bodies marked in black.

The plurality of cutting bodies include blackened cutting bodies 103, 113 and 123 which are numbered by way of example in FIG. 4. The position of the cutting body 33 on the main body 2 and the configuration of the cutting body 33 are unchanged in relation to the embodiment according to FIGS. 1A, 1B, 2A and 2B. Furthermore, the cutting body 33 is also part of the plurality of cutting bodies. The cutting edge 34 of the cutting body 33 has the axial width ab4 both in FIGS. 2A and 2B and in FIG. 4.

The cutting bodies 3, 13 and 23 from FIGS. 2A and 2B have been replaced in FIG. 4 by the cutting bodies 103, 113 and 123. The cutting bodies 103, 113, 123 have cutting edges 104, 114, 124 with reference points 105, 115, 125. The reference points 105, 115, 125 are in each case arranged at the same location on the main body 2 as the reference points 5, 15, 25 of the cutting bodies 3, 13, 23 which have been replaced by the cutting bodies 103, 113, 123. The reference points 105, 115 and 125 of the cutting bodies 103, 113 and 123 are in each case arranged directly adjacent to one another in the direction perpendicular to the direction of rotation 49, in the embodiment in the direction of the axis of rotation 50. The reference points 105, 115 and 125 have the same axial spacings a1, a2 and a3 to one another as the reference points 5, 15 and 25 in the embodiment according to FIG. 2.

In the embodiment according to FIG. 4, the cutting edges 104, 114, 124 of the cutting bodies 103, 113 and 123 have a width measured perpendicular to the direction of rotation 49. The widths extend in the direction of the axis of rotation 50 and are referred to as axial widths ab101, ab102, ab103. The axial widths ab101, ab102, ab103 are measured in the direction of the axis of rotation 50. The axial width ab101 is assigned to the cutting edge 104. The axial width ab102 is assigned to the cutting edge 114. The axial width ab103 is assigned to the cutting edge 124. The axial widths ab101, ab102 and ab103 are of equal size.

The widths, measured in the direction perpendicular to the direction of rotation 49, of the cutting edges of the plurality of cutting bodies 33, 103, 113, 123 are of different size. The axial width ab101, ab102, ab103 of the cutting edge 104, 114, 124 of the cutting body 103, 113, 123 and the axial width ab4 of the cutting edge 34 of the cutting body 33 are of different size.

Due to the fact that the axial widths ab101, ab102 and ab103 of the cutting edges 104, 114, 124 of the cutting bodies 103, 113, 123 are greater and at the same time the arrangement of the reference points 105, 115, 125 on the main body 2 is unchanged in relation to the arrangement of the reference points 5, 15, 25 in the embodiment according to FIGS. 2A and 2B, the cutting edges 104, 114, 124 overlap in the direction perpendicular to the direction of rotation 49, in the embodiment in the direction of the axis of rotation 50, to a greater extent in FIG. 4 than in FIGS. 2A and 2B. In the embodiment according to FIG. 4, one portion of the plurality of cutting bodies 33, 103, 113, 123 overlaps to a greater extent than the other portion.

Figure 5:
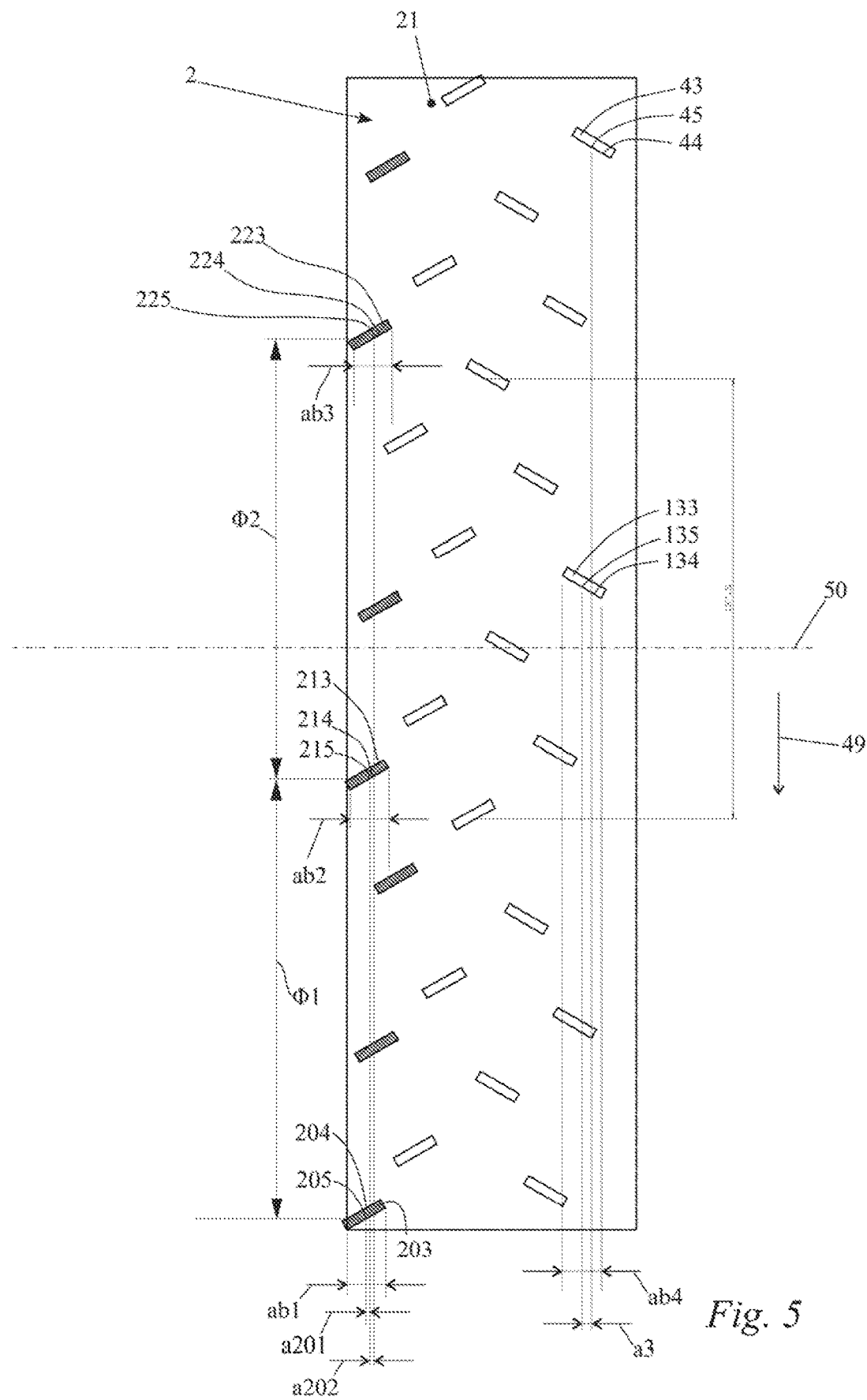
FIG. 5 shows a schematic developed view of a further embodiment of a machining tool with different axial spacings of the reference points of cutting edges that are directly adjacent in the direction of the axis of rotation.

FIG. 5 shows a schematic developed view of a further alternative embodiment for a machining tool 1. The basic construction of the machining tool 1 according to FIG. 5 is identical to the basic construction of the machining tool 1 according to FIGS. 1A, 1B, 2A and 2B. Identical components or components which are arranged in an identical manner and identical variables are denoted by the same reference designations. With regard to the basic construction and to any configuration that is unchanged in relation to the embodiment according to FIGS. 1A, 1B, 2A and 2B, reference is made to the description relating to the embodiment according to FIGS. 1A, 1B, 2A and 2B. In the text which follows, only the differences between the embodiment according to FIG. 5 and the embodiment according to FIGS. 1A, 1B, 2A and 2B are described.

The machining tool 1 according to FIG. 5 differs from the embodiment according to FIGS. 1A, 1B, 2A and 2B by the arrangement of the cutting bodies marked in black on the main body 2.

The plurality of cutting bodies include blackened cutting bodies 203, 213 and 223 which are numbered by way of example in FIG. 5. In addition, a further cutting body is denoted by the reference designation 43. The cutting body 43 is also part of the plurality of cutting bodies. In addition, a further cutting body is denoted by the reference designation 133. The cutting body 133 is also part of the plurality of cutting bodies.

The cutting bodies 3, 13 and 23 from FIG. 2A have been replaced in FIG. 5 by the cutting bodies 203, 213 and 223. The cutting bodies 203, 213, 223 have cutting edges 204, 214, 224 with reference points 205, 215, 225. The cutting edges 204, 214 and 224 have the same axial widths ab1, ab2 and ab3 as the cutting edges 4, 14 and 24 in the embodiment according to FIG. 2A. The cutting body 43 has a cutting edge 44 with a reference point 45. The cutting body 133 has a cutting edge 134 with a reference point 135.

The reference points 205, 215, 225 are in each case arranged at a different location on the main body 2 to the reference points 5, 15, 25 of the cutting bodies 3, 13, 23 which have been replaced by the cutting bodies 203, 213, 223. The reference points 205, 215 and 225 of the cutting bodies 203, 213 and 223 are in each case arranged directly adjacent to one another in the direction perpendicular to the direction of rotation 49, in the embodiment in the direction of the axis of rotation 50. The reference points 205, 215 and 225 have different axial spacings a201, a202 and a203 to one another than the reference points 5, 15 and 25 in the embodiment according to FIG. 2A. The reference point 205 has the axial spacing a201 to the reference point 215. The reference point 215 has the axial spacing a202 to the reference point 225. In the embodiment according to FIG. 5, the reference points 205, 215, 225 are also spaced apart from one another with respect to the axis of rotation 50. Correspondingly, the axial spacings a201, a202 are measured in the direction of the axis of rotation 50.

The reference point 135 has the axial spacing a3 to the reference point 45. The axial spacing a3 between the reference points 135 and 45 corresponds in terms of magnitude to the axial spacings a1 and a2 from FIG. 2A. The reference points 135 and 45 are spaced apart from one another in the direction perpendicular to the direction of rotation 49, in the embodiment in the direction of the axis of rotation 50, and lie directly adjacent to one another in these directions.

The axial spacings a3, a201, a202 between reference points 205, 215, 225, 35 and 45, which are directly adjacent in the direction of the axis of rotation 50, of the cutting edges 204, 214, 224, 34 and 44 of the plurality of cutting bodies 203, 213, 223, 133 and 43 are of different size. The axial spacings a201, a202 of the reference points 205, 215, 225 to one another are smaller than the axial spacings a1, a2 of the reference points 5, 15, 25 in the embodiment according to FIG. 2A. As a result, the position of the reference points which are arranged successively on the main body 2 with respect to the direction perpendicular to the direction of rotation also changes in comparison with FIG. 2A. The axial spacings a201, a202 of the reference points 205, 215, 225 to one another are smaller than the axial spacing a3 of the reference points 35 and 45 to one another. The axial spacing a201, a202 is from 1% to 99%, in particular from 30% to 99%, in particular from 50% to 99%, in particular from 50% to 90%, in particular from 30% to 70%, of the axial spacing a3.

The cutting edge 134 of the cutting body 133 has the axial width ab4, which corresponds in terms of magnitude to the axial width ab4 from FIG. 2A. The axial widths of the cutting edges of the remaining, non-blackened cutting bodies in FIG. 5 are of equal size to the axial widths of the cutting edges of the corresponding cutting bodies in FIG. 2A. The cutting body 133 from FIG. 5 corresponds to the cutting body 33 from FIG. 2A—only the reference point 135 of the cutting body 133 is arranged at a different location on the cutter carrier surface than previously for the reference point 35 of the cutting body 33.

Due to the fact that the axial widths ab1, ab2, ab3 and ab4 of the cutting edges 204, 214, 224 and 134 of the cutting bodies 203, 213, 223 and 133 in the embodiment according to FIG. 5 are of equal size compared with the embodiment according to FIG. 2A and at the same time the arrangement of the reference points 205, 215, 225 on the main body 2 has been changed such that the axial spacings a201, a202 of the reference points 205, 215, 225 to one another in the embodiment according to FIG. 5 are smaller than the axial spacings a1, a2 of the reference points 5, 15, 25 in the embodiment according to FIG. 2A, the cutting edges 204, 214, 224 overlap in the direction perpendicular to the direction of rotation 49, in the embodiment in the direction of the axis of rotation 50, to a greater extent in FIG. 5 than in FIG. 2A. In the embodiment according to FIG. 5, one portion of the plurality of cutting bodies 133, 43, 203, 213, 223 overlaps to a greater extent than the other portion.

Figure 6:
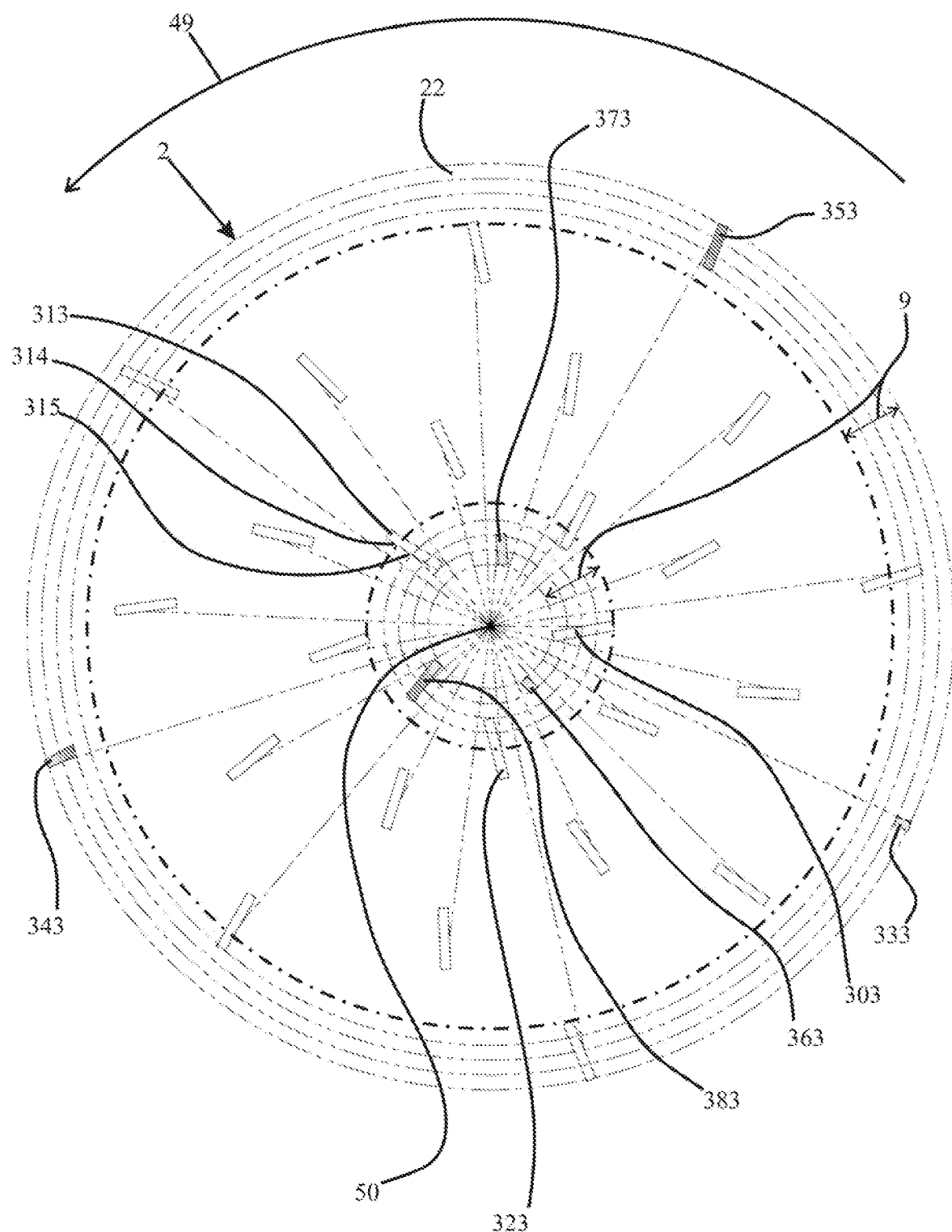
FIG. 6 shows a schematic front view of a machining tool in which the plurality of cutting edges are arranged on an imaginary helix line in the form of a planar spiral and in which further cutting bodies that do not belong to the plurality of cutting bodies are arranged in the peripheral region.

The description of the embodiment according to FIG. 3 also applies to the embodiment according to FIG. 6. The embodiment according to FIG. 6 additionally has further cutting bodies 333, 343, 353, 363, 373 and 383.

The cutter carrier surface has a peripheral region 9 which extends, with respect to the radial direction with respect to the axis of rotation 50, exactly over the entire initial cutting edge and/or exactly over the entire final cutting edge and which runs completely around the axis of rotation 50 in the direction of rotation 49. This peripheral region 9 is also referred to as lying behind the initial cutting edge and/or behind the final cutting edge in the direction of rotation 49. In particular, in addition to the plurality of cutting bodies 303, 313, 323, at least one further cutting body 333, 343, 353, 363, 373 and/or 383 that does not belong to the plurality of cutting bodies 303, 313, 323 is arranged in the peripheral region 9. The at least one further cutting body 333, 343, 353, 363, 373 and/or 383 is depicted in hatched form in FIG. 6.

Figure 7:
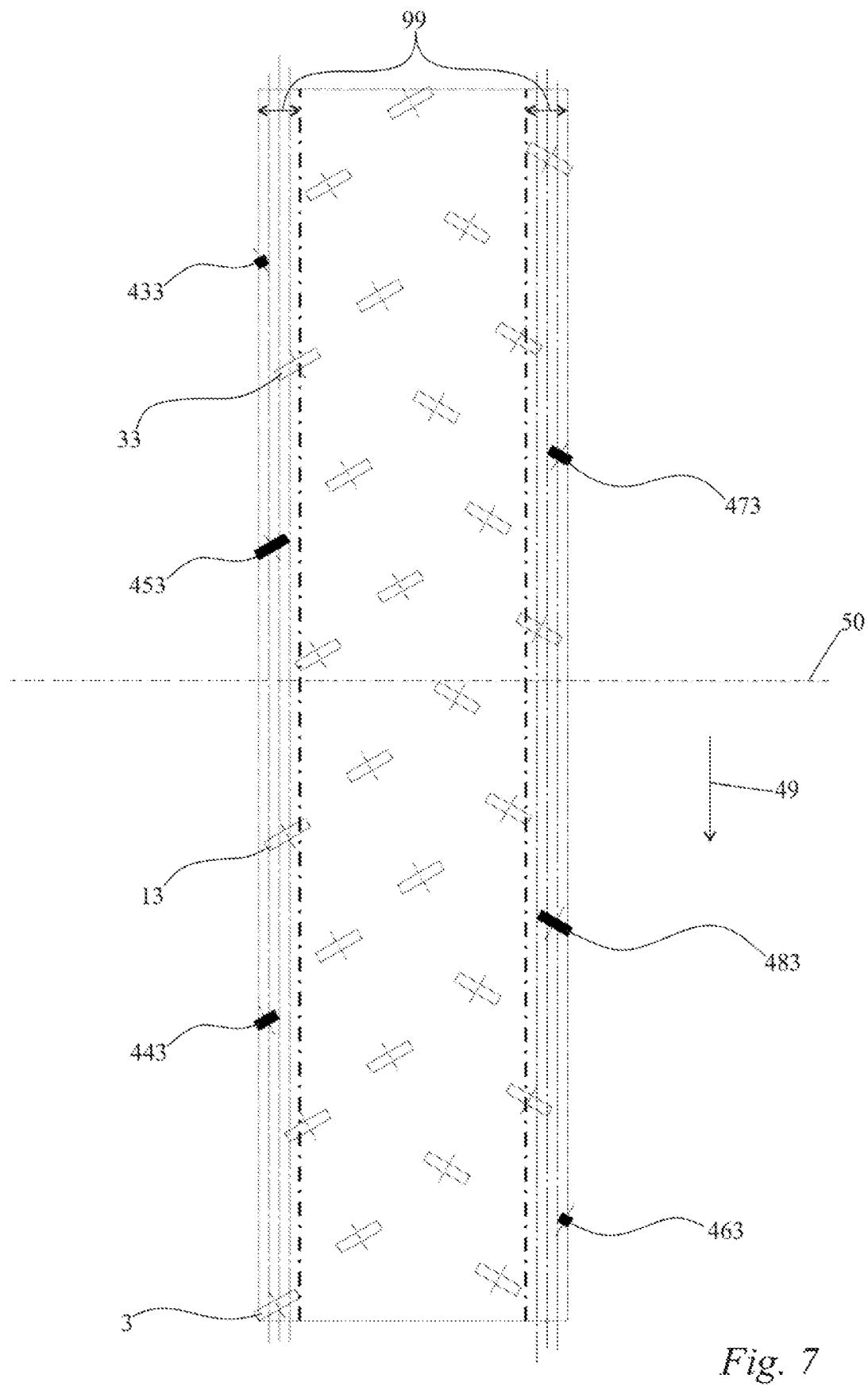
FIG. 7 shows a schematic developed view of the circumferential side of a machining tool in which further cutting bodies that do not belong to the plurality of cutting bodies are arranged in the peripheral region; and, FIG. 8 shows a schematic developed view of the circumferential side of a machining tool in which two groups of a plurality of cutting bodies are arranged on the main body of the machining tool, the groups being arranged on imaginary helix lines that run in opposite directions to one another.

The description of the embodiment according to FIG. 2A also applies to the embodiment according to FIG. 7. The embodiment according to FIG. 7 additionally has further cutting bodies 433, 443, 453, 463, 473 and 483.

The cutter carrier surface has a peripheral region 99 which extends, with respect to the direction of the axis of rotation 50, exactly over the entire initial cutting edge and/or exactly over the entire final cutting edge and which runs completely around the axis of rotation 50 in the direction of rotation 49. This peripheral region 99 is also referred to as lying behind the initial cutting edge and/or behind the final cutting edge in the direction of rotation 49. In particular, in addition to the plurality of cutting bodies 3, 13, 23, at least one further cutting body 433, 443, 453, 463, 473 and/or 483 that does not belong to the plurality of cutting bodies 3, 13, 23 is arranged in the peripheral region 99. The at least one further cutting body 433, 443, 453, 463, 473 and/or 483 is depicted in black in FIG. 7.

Figure 8:
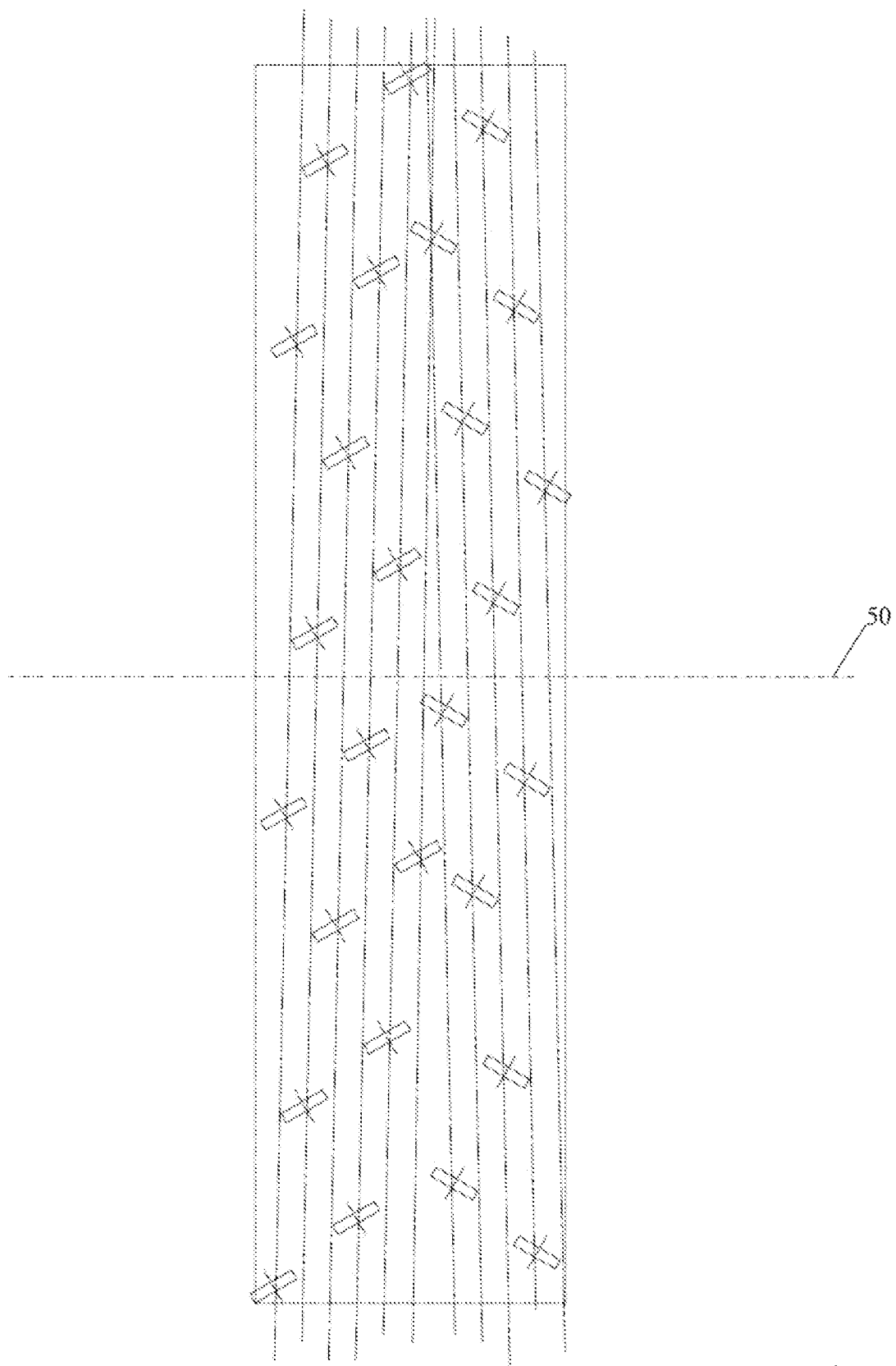

FIG. 8 shows an embodiment of a machining tool, to which embodiment the description relating to the embodiment according to FIG. 2B applies. In addition to the first group of a plurality of cutting bodies, a second group of a plurality of cutting bodies is provided. The first group of a plurality of cutting bodies and the second group of a plurality of cutting bodies are arranged on the main body of the machining tool. The plurality of cutting bodies assigned to a group may each individually have all or only some of the above-described properties of the plurality of cutting bodies. However, the plurality of cutting bodies assigned to a group have at least the properties of the plurality of cutting bodies according to the disclosure. An imaginary first helix line assigned to the first group runs around the axis of rotation 50 in the opposite direction of rotation to a second helix line assigned to the second group.

It is understood that the foregoing description is that of the preferred embodiments of the invention and that various changes and modifications may be made thereto without departing from the spirit and scope of the invention as defined in the appended claims.

The invention claimed is:

1. A machining tool for machining materials, the machining tool being configured to be driven in rotation about an axis of rotation, the machining tool comprising:
a main body defining a cutter carrier surface, wherein the axis of rotation runs through said main body;
a plurality of cutting bodies each having a cutting edge and being arranged on said cutter carrier surface;
said cutting edges being configured to rotate in a direction of rotation which runs around the axis of rotation during the machining;
wherein said cutting edges of a group including a multiplicity of said plurality of cutting bodies overlap in a gapless manner with respect to a direction perpendicular to the direction of rotation and thus form an overall cutting edge; each of said cutting edges of said group having exactly one reference point;
wherein said reference points lie in a center of a corresponding one of said cutting edges in the direction perpendicular to the direction of rotation;
said reference points of said cutting edges of said group are spaced apart from one another in the direction perpendicular to the direction of rotation;
one of said cutting edges of said group being an initial cutting edge of said overall cutting edge;
one of said cutting edges of said group being a final cutting edge of said overall cutting edge;
an intermediate region of the overall cutting edge lying completely between said initial cutting edge and said final cutting edge with respect to the direction perpendicular to the direction of rotation;
all of said cutting edges of the machining tool being arranged between a first end point of said overall cutting edge and a second end point of said overall cutting edge;
said first end point being assigned to said initial cutting edge and said second end point being assigned to said final cutting edge;
the machining tool defining an imaginary helix line running from said initial cutting edge to said final cutting edge;
said imaginary helix line defining a central axis which corresponds to the axis of rotation;
said imaginary helix line running at least partially around said central axis;
said imaginary helix line having a gradient which corresponds to a quotient of a progression of said imaginary helix line in the direction perpendicular to the direction of rotation and a progression of said imaginary helix line with regard to an angle of rotation about the axis of rotation;
all of said cutting edges of said group being at least partially arranged on said imaginary helix line;
said group having a minimum number of teeth, wherein said minimum number of teeth is defined by a number of said cutting edges of said group that are at least situated in succession in the direction of rotation of the machining tool in said intermediate region of said overall cutting edge; and,
said cutting edges of said group overlap with respect to the direction perpendicular to the direction of rotation such that said minimum number of teeth is at least two.

2. The machining tool of claim 1, wherein said cutting edges of said overall cutting edge in each case only partially mutually overlap with respect to the direction perpendicular to the direction of rotation.

3. The machining tool of claim 1, wherein said reference points of said cutting edges of said group that are directly adjacent in the direction perpendicular to the direction of rotation are arranged with an angular spacing to one another with respect to the axis of rotation; each of said angular spacings are integer multiples of angle values; and, wherein said angle values lie in an angle range of 10° to 350°.

4. The machining tool of claim 3, wherein the angle values lie in an angle range of +/−5° with respect to a golden angle, a sum of the golden angle and an opposite angle producing a round angle and a ratio of said golden angle to said opposite angle being equal to a ratio of said opposite angle to said round angle.

5. The machining tool of claim 3, wherein said angular spacings correspond to one times said angle values from said angle range.

6. The machining tool of claim 1, wherein said reference points are spaced apart from one another in at least one of the direction of the axis of rotation and a radial direction with respect to the axis of rotation.

7. The machining tool of claim 1, wherein said main body has a circumferential surface with respect to the axis of rotation; said main body is delimited by an end surface in the direction of the axis of rotation; and, said plurality of cutting bodies of said group are arranged on at least one of said circumferential surface and said end surface.

8. The machining tool of claim 1, wherein at least one of: said cutting edges of said group each have an axial width measured in the direction of the axis of rotation, and said cutting edges of said plurality of cutting bodies each have a radial width measured in a radial direction with respect to the axis of rotation.

9. The machining tool of claim 8, wherein each of said cutting edges of said group has exactly one reference point; and at least one of:
said reference points of said group which are directly adjacent in the direction perpendicular to the direction of rotation are arranged with an axial spacing, measured in the direction of the axis of rotation, to one another; and, said reference points of said group which are adjacent in the direction perpendicular to the direction of rotation are arranged with a radial range spacing to one another, said radial range spacing corresponding to a difference between a larger radial spacing and a smaller radial spacing of said reference points which are radially adjacent of one another.

10. The machining tool of claim 9, wherein at least one of:
said axial spacing lies in a range from 1% to 50% of a greatest axial width; and,
said radial range spacing lies in a range from 1% to 50% of a greatest radial width.

11. The machining tool of claim 8, wherein said cutter carrier surface has, in the direction of rotation, behind at least one of said initial cutting edge and said final cutting edge, a peripheral region which extends over at least one of an entirety of said axial width and an entirety of said radial width of said initial cutting edge and/or said final cutting edge, said peripheral region running around the axis of rotation; and, at least one further cutting body is arranged in the peripheral region in addition to the plurality of cutting bodies of said group.

12. The machining tool of claim 8, wherein at least one of said axial width and said radial width of at least the initial cutting edge and/or of at least the final cutting edge is greater or smaller than that of said cutting edges of said cutting bodies outside of said peripheral region.

13. The machining tool of claim 8, wherein each of said cutting edges of said group has exactly one reference point; and, at least one of:
said axial spacings of all of said reference points of said group which are directly adjacent in the direction of the axis of rotation are of equal size; and,
all of said reference points of said group which are directly adjacent in the radial direction with respect to the axis of rotation define radial range spacings of equal size.

14. The machining tool of claim 1, wherein the machining tool comprises only a single group of said cutting bodies; said cutting edges of said single group overlap, between said first end point and said second end point of said overall cutting edge, in a gapless manner with respect to the direction perpendicular to the direction of rotation; and, said cutting edges of said single group are at least partially arranged on said imaginary helix line.

15. The machining tool of claim 1, wherein said minimum number of teeth is at least three.

16. The machining tool of claim 1, wherein said gradient of said imaginary helix line is constant.

17. The machining tool of claim 5, wherein said angular spacings are all of equal size.

18. The machining tool of claim 3, wherein the angle values lie in an angle range of +/−0.5° with respect to a golden angle, a sum of the golden angle and an opposite angle producing a round angle and a ratio of said golden angle to said opposite angle being equal to a ratio of said opposite angle to said round angle.

* * * * *